United States Patent
Manolakos et al.

(10) Patent No.: US 12,212,522 B2
(45) Date of Patent: Jan. 28, 2025

(54) REFERENCE SIGNAL RESOURCE ASSOCIATION OPTIONS FOR ENHANCED SOUNDING

(71) Applicant: Qualcomm Incorporated, San Diego, CA (US)

(72) Inventors: Alexandros Manolakos, Escondido, CA (US); Yi Huang, San Diego, CA (US); Wanshi Chen, San Diego, CA (US); Pavan Kumar Vitthaladevuni, San Diego, CA (US); Krishna Kiran Mukkavilli, San Diego, CA (US); Bo Chen, Beijing (CN); Ruifeng Ma, Beijing (CN); Weimin Duan, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 17/768,664

(22) PCT Filed: Oct. 31, 2019

(86) PCT No.: PCT/CN2019/114607
§ 371 (c)(1),
(2) Date: Apr. 13, 2022

(87) PCT Pub. No.: WO2021/081869
PCT Pub. Date: May 6, 2021

(65) Prior Publication Data
US 2023/0163913 A1 May 25, 2023

(51) Int. Cl.
*H04L 5/00* (2006.01)
*H04W 72/0453* (2023.01)

(52) U.S. Cl.
CPC ....... *H04L 5/0051* (2013.01); *H04W 72/0453* (2013.01)

(58) Field of Classification Search
CPC .................. H04L 5/0051; H04W 72/0453
See application file for complete search history.

(56) References Cited

U.S. PATENT DOCUMENTS 9,363,055 B2 * 6/2016 Zeng ..................... H04L 5/001
2017/0141901 A1 5/2017 Rico Alvarino et al.
(Continued)

FOREIGN PATENT DOCUMENTS

CN 109075935 12/2018
EP 2375618 A1 10/2011
(Continued)

OTHER PUBLICATIONS

Supplementary European Search Report—EP19951151—Search Authority—The Hague—Jun. 23, 2023 (200350EP).
(Continued)

*Primary Examiner* — Won Tae C Kim
(74) *Attorney, Agent, or Firm* — QUALCOMM Incorporated

(57) ABSTRACT

Methods, systems, and devices for wireless communications are described. A user equipment (UE) may receive a configuration identifying a first set of frequency resources for transmitting a sounding reference signal, where the sounding reference signal may be used at least for downlink channel state information acquisition. The UE may receive an indication of an association between the configuration for the sounding reference signal and a second set of frequency resources and determine, based on the association, values for one or more sounding reference signal transmission parameters for the first set of frequency resources. The UE may transmit the sounding reference signal on the first set of
(Continued)

frequency resources based on the determined one or more values.

29 Claims, 16 Drawing Sheets

(56) References Cited

U.S. PATENT DOCUMENTS

| | | |
|---|---|---|
| 2017/0290041 A1 | 10/2017 | Rico Alvarino et al. |
| 2018/0102887 A1 | 4/2018 | Chen et al. |
| 2019/0021017 A1 | 1/2019 | Nagaraja et al. |
| 2019/0260533 A1 | 8/2019 | Manolakos et al. |
| 2020/0036556 A1* | 1/2020 | Wei .................. H04W 72/21 |
| 2020/0177342 A1* | 6/2020 | Pawar ................ H04W 72/23 |
| 2020/0213066 A1* | 7/2020 | Ma ................... H04L 43/0876 |
| 2021/0068058 A1* | 3/2021 | Sun ................... H04W 52/14 |

FOREIGN PATENT DOCUMENTS

| | | |
|---|---|---|
| EP | 3327945 A1 | 5/2018 |
| WO | WO-2017083137 | 5/2017 |
| WO | WO-2017173216 | 10/2017 |
| WO | WO-2019096244 A1 | 5/2019 |

OTHER PUBLICATIONS

International Search Report and Written Opinion—PCT/CN2019/114607—ISA/EPO—Mar. 13, 2020.

\* cited by examiner

US 12,212,522 B2

REFERENCE SIGNAL RESOURCE ASSOCIATION OPTIONS FOR ENHANCED SOUNDING

CROSS REFERENCE

The present Application is a 371 national stage filing of International PCT Application No. PCT/CN2019/114607 by Manolakos et al., entitled "REFERENCE SIGNAL RESOURCE ASSOCIATION OPTIONS FOR ENHANCED SOUNDING," filed Oct. 31, 2019, which is assigned to the assignee hereof, and which is expressly incorporated by reference in its entirety herein.

BACKGROUND

The following relates generally to wireless communications, and more specifically to reference signal resource association options for enhanced sounding.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may be configured to transmit reference signals to a base station on a channel, and the base station may obtain channel state information for the channel based on the reference signals. Some techniques for obtaining channel state information can be improved.

SUMMARY

The described techniques relate to improved methods, systems, devices, and apparatuses that support reference signal resource association options for enhanced sounding. Generally, the described techniques provide for indicating, to a user equipment (UE), how a sounding reference signal (SRS) is used. In some wireless communications systems, a UE may transmit an SRS on an uplink channel to a base station, and the base station may determine channel conditions for the uplink channel based on the SRS. A UE may not be supported to transmit an SRS on all carriers, bands, bandwidth parts, or other frequencies of the wireless communications system. However, channel estimates on closely spaced component carriers may be correlated due to partial channel reciprocity. Therefore, SRS transmission on one component carrier may be used for downlink beamforming on other component carriers, such as adjacent component carriers or component carriers nearby in frequency.

The techniques described herein support enhanced reference signal sounding based on an association of an SRS frequency resource to an associated bandwidth. These techniques may be implemented based on a base station indicating the association to a UE. When configuring the UE for an SRS that is used to derive downlink channel state information (CSI) for an associated bandwidth, the base station may send an indication of how the SRS is used. Generally, the indication may indicate to the UE that the SRS is being used to derive CSI on another specific frequency, instead of, or in addition to, the frequency resource on which the SRS is transmitted. The indication may be explicit or implicit, indicating that CSI is derived on a bandwidth within the active bandwidth part (BWP), a different BWP, a different component carrier of the same radio frequency spectrum band, or a different component carrier of a different radio frequency spectrum band based on the SRS. This may enable the UE to adjust the SRS transmission to align with the channel conditions on the other bandwidth. For example, the UE may apply one or more uplink precodings, make path-loss adjustments, or adjust a spatial transmit beam.

A method of wireless communications at a UE is described. The method may include receiving a configuration identifying a first set of frequency resources for transmitting a sounding reference signal to be used at least for downlink channel state information acquisition, receiving an indication of an association between the configuration for the sounding reference signal and a second set of frequency resources, determining, based on the association, values for one or more sounding reference signal transmission parameters for the first set of frequency resources, and transmitting the sounding reference signal on the first set of frequency resources based on the determined one or more values.

An apparatus for wireless communications at a UE is described. The apparatus may include a processor, memory coupled with the processor, and instructions stored in the memory. The instructions may be executable by the processor to cause the apparatus to receive a configuration identifying a first set of frequency resources for transmitting a sounding reference signal to be used at least for downlink channel state information acquisition, receive an indication of an association between the configuration for the sounding reference signal and a second set of frequency resources, determine, based on the association, values for one or more sounding reference signal transmission parameters for the first set of frequency resources, and transmit the sounding reference signal on the first set of frequency resources based on the determined one or more values.

Another apparatus for wireless communications at a UE is described. The apparatus may include means for receiving a configuration identifying a first set of frequency resources for transmitting a sounding reference signal to be used at least for downlink channel state information acquisition, receiving an indication of an association between the configuration for the sounding reference signal and a second set of frequency resources, determining, based on the association, values for one or more sounding reference signal transmission parameters for the first set of frequency resources, and transmitting the sounding reference signal on the first set of frequency resources based on the determined one or more values.

A non-transitory computer-readable medium storing code for wireless communications at a UE is described. The code may include instructions executable by a processor to receive a configuration identifying a first set of frequency resources for transmitting a sounding reference signal to be used at least for downlink channel state information acquisition, receive an indication of an association between the configuration for the sounding reference signal and a second set of frequency resources, determine, based on the association, values for one or more sounding reference signal transmission parameters for the first set of frequency resources, and transmit the sounding reference signal on the first set of frequency resources based on the determined one or more values.

In some examples of the method, apparatuses, and non-transitory computer-readable medium described herein, the determining of the transmission parameters may be based at least in part of measuring a channel quality or an interference, or both, of a received physical channel or a received physical signal, or both, within the second set of frequency resources.

In some examples of the method, apparatuses, and non-transitory computer-readable medium described herein, the second set of frequency resources includes frequency resources that may be not included in the first set of frequency resources.

In some examples of the method, apparatuses, and non-transitory computer-readable medium described herein, the second set of frequency resources may be a superset of the first set of frequency resources.

In some examples of the method, apparatuses, and non-transitory computer-readable medium described herein, determining values for the one or more sounding reference signal transmission parameters further may include operations, features, means, or instructions for determining one or more uplink precoders for transmitting the sounding reference signal based on the association between the first set of frequency resources and the second set of frequency resources, and applying the one or more uplink precoders when transmitting the sounding reference signal on the first set of frequency resources.

In some examples of the method, apparatuses, and non-transitory computer-readable medium described herein, the one or more sounding reference signal transmission parameters include one or more uplink precoders, an uplink transmit power, one or more spatial transmit directions, or any combination thereof.

Some examples of the method, apparatuses, and non-transitory computer-readable medium described herein may further include operations, features, means, or instructions for receiving a configuration identifying resources to use to receive a channel state information reference signal, where the indication of the association may be based on the configuration for the channel state information reference signal.

Some examples of the method, apparatuses, and non-transitory computer-readable medium described herein may further include operations, features, means, or instructions for receiving the channel state information reference signal, where the values for the one or more sounding reference signal transmission parameters may be determined based on the received channel state information reference signal.

Some examples of the method, apparatuses, and non-transitory computer-readable medium described herein may further include operations, features, means, or instructions for receiving, jointly with the configuration identifying the first set of frequency resources, a configuration for one or more channel state information reference signals associated with the second set of frequency resources, where the association between the first set of frequency resources and the second set of frequency resources may be determined based on the jointly received configurations.

Some examples of the method, apparatuses, and non-transitory computer-readable medium described herein may further include operations, features, means, or instructions for receiving a media access control control element activating semi-persistent occasions for the first set of frequency resources and the second set of frequency resources.

In some examples of the method, apparatuses, and non-transitory computer-readable medium described herein, the first set of frequency resources and the second set of frequency resources include different bandwidths, bandwidth parts, component carriers, radio frequency spectrum bands, or any combination thereof.

Some examples of the method, apparatuses, and non-transitory computer-readable medium described herein may further include operations, features, means, or instructions for identifying that the first set of frequency resources and the second set of frequency resources may be in a same bandwidth part, different bandwidth parts, different component carriers of a same radio frequency spectrum band, or different component carriers of different radio frequency spectrum bands.

Some examples of the method, apparatuses, and non-transitory computer-readable medium described herein may further include operations, features, means, or instructions for transmitting an indication of a UE capability associated with a frequency domain gap between the first set of frequency resources and the second set of frequency resources.

In some examples of the method, apparatuses, and non-transitory computer-readable medium described herein, the first set of frequency resources correspond to a first subset of resources within a first downlink component carrier and a second subset of resources within a second downlink component carrier, and where a set of transmission occasions of the sounding reference signal may be transmitted on the first downlink component carrier and the second uplink component carrier based on a sounding reference signal carrier switching indication triggered through a third uplink component carrier.

In some examples of the method, apparatuses, and non-transitory computer-readable medium described herein, the second set of frequency resources include a bandwidth that may be a higher frequency than the subset of resources of the first downlink component carrier, and the bandwidth may be lower in frequency than the subset of resources of the second downlink component carrier.

Some examples of the method, apparatuses, and non-transitory computer-readable medium described herein may further include operations, features, means, or instructions for identifying that the sounding reference signal may have a higher priority than other sounding reference signals based on the configuration of the second set of frequency resources and the sounding reference signal being used for downlink channel state information acquisition.

Some examples of the method, apparatuses, and non-transitory computer-readable medium described herein may further include operations, features, means, or instructions for determining that the second set of frequency resources includes frequency resources within one or more different bandwidth parts, or within one or multiple component carriers, or frequency resources that may be not part of the first set of frequency resources, where the sounding reference signal may be identified as having the higher priority than the other sounding reference signals based on the second set of frequency resources including the frequency resources within the one or more different bandwidth parts, or within the one or multiple component carrier, or the frequency resources that may be not part of the first set of frequency resources.

In some examples of the method, apparatuses, and non-transitory computer-readable medium described herein, the higher priority may be associated with a higher priority with respect to a transmission power reduction due to carrier aggregation power scaling prioritization.

In some examples of the method, apparatuses, and non-transitory computer-readable medium described herein, the indication of the association between the first set of frequency resources and the second set of frequency resources may be received with the configuration identifying the first set of frequency resources for transmitting the sounding reference signal.

A method of wireless communications at a base station is described. The method may include transmitting, to a UE, a configuration identifying a first set of frequency resources for the UE to use to transmit a sounding reference signal to be used at least for downlink channel state information acquisition, transmitting an indication of an association between the first set of frequency resources and a second set of frequency resources, receiving, from the UE, the sounding reference signal on the first set of frequency resources based on the association, and determining, based on the received sounding reference signal, channel state information for at least the second set of frequency resources.

An apparatus for wireless communications at a base station is described. The apparatus may include a processor, memory coupled with the processor, and instructions stored in the memory. The instructions may be executable by the processor to cause the apparatus to transmit, to a UE, a configuration identifying a first set of frequency resources for the UE to use to transmit a sounding reference signal to be used at least for downlink channel state information acquisition, transmit an indication of an association between the first set of frequency resources and a second set of frequency resources, receive, from the UE, the sounding reference signal on the first set of frequency resources based on the association, and determine, based on the received sounding reference signal, channel state information for at least the second set of frequency resources.

Another apparatus for wireless communications at a base station is described. The apparatus may include means for transmitting, to a UE, a configuration identifying a first set of frequency resources for the UE to use to transmit a sounding reference signal to be used at least for downlink channel state information acquisition, transmitting an indication of an association between the first set of frequency resources and a second set of frequency resources, receiving, from the UE, the sounding reference signal on the first set of frequency resources based on the association, and determining, based on the received sounding reference signal, channel state information for at least the second set of frequency resources.

A non-transitory computer-readable medium storing code for wireless communications at a base station is described. The code may include instructions executable by a processor to transmit, to a UE, a configuration identifying a first set of frequency resources for the UE to use to transmit a sounding reference signal to be used at least for downlink channel state information acquisition, transmit an indication of an association between the first set of frequency resources and a second set of frequency resources, receive, from the UE, the sounding reference signal on the first set of frequency resources based on the association, and determine, based on the received sounding reference signal, channel state information for at least the second set of frequency resources.

Some examples of the method, apparatuses, and non-transitory computer-readable medium described herein may further include operations, features, means, or instructions for transmitting a configuration indicating resources for a channel state information reference signal, where the indication of the association may be based on the configuration for the channel state information reference signal.

Some examples of the method, apparatuses, and non-transitory computer-readable medium described herein may further include operations, features, means, or instructions for transmitting, jointly with the configuration identifying the first set of frequency resources, a configuration for one or more channel state information reference signals associated with the second set of frequency resources, where the association between the first set of frequency resources and the second set of frequency resources may be implicitly indicated based on the jointly transmitted configurations.

Some examples of the method, apparatuses, and non-transitory computer-readable medium described herein may further include operations, features, means, or instructions for transmitting a media access control control element to activate semi-persistent occasions for the first set of frequency resources and the second set of frequency resources.

In some examples of the method, apparatuses, and non-transitory computer-readable medium described herein, the first set of frequency resources and the second set of frequency resources include different bandwidths, bandwidth parts, component carriers, radio frequency spectrum bands, or any combination thereof.

In some examples of the method, apparatuses, and non-transitory computer-readable medium described herein, the association indicates that the first set of frequency resources and the second set of frequency resources may be in a same bandwidth part, different bandwidth parts, different component carriers of a same radio frequency spectrum band, or different component carriers of different radio frequency spectrum band.

Some examples of the method, apparatuses, and non-transitory computer-readable medium described herein may further include operations, features, means, or instructions for receiving an indication of a UE capability associated with a gap between the first set of frequency resources and the second set of frequency resources, where the configuration identifying the first set of frequency resources may be based on the UE capability.

In some examples of the method, apparatuses, and non-transitory computer-readable medium described herein, the first set of frequency resources includes a first uplink component carrier and second uplink component carrier, and where the sounding reference signal may be received on the first uplink component carrier and the second uplink component carrier based on a sounding reference signal carrier switching.

In some examples of the method, apparatuses, and non-transitory computer-readable medium described herein, the indication of the association between the first set of frequency resources and the second set of frequency resources may be received with the configuration identifying the first set of frequency resources for transmitting the sounding reference signal.

DETAILED DESCRIPTION

Figure 1:
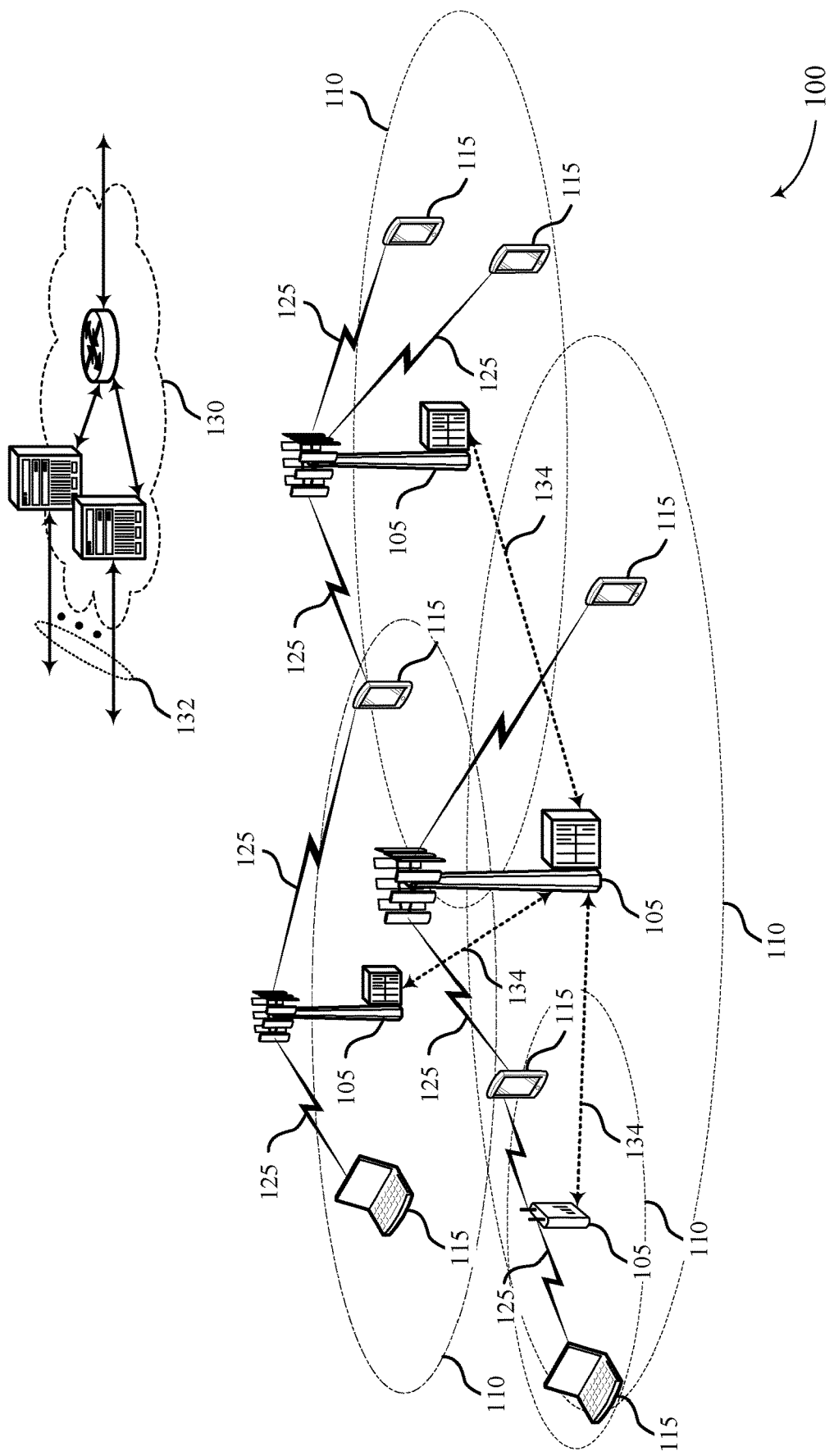
FIG. 1 illustrates an example of a system for wireless communications that supports reference signal resource association options for enhanced sounding in accordance with aspects of the present disclosure.

In some wireless communications systems, a user equipment (UE) may transmit a sounding reference signal (SRS) on an uplink channel to a base station, and the base station may determine channel conditions for the uplink channel based on the SRS. However, a UE may not be supported to transmit an SRS on all carriers or frequencies of the wireless communications system. For example, some carriers used by the UE may be configured for downlink communications, but not uplink communications. Due to partial reciprocity between channels, channel estimates on closely spaced component carriers may be correlated. Therefore, SRS transmission in one set of frequency resources (e.g., on one component carrier) may be used for downlink beamforming in another set of adjacent or nearby frequency resources (e.g., on other component carriers, such as adjacent component carriers or component carriers nearby in frequency). In some cases, a UE may transmit an antenna switching SRS for a base station to obtain a downlink channel from SRS signals assuming channel reciprocity. Additionally, a base station may indicate some uses of an SRS when configuring the SRS, such as if the SRS is used for beam management, codebook based or non-codebook based transmission, or antenna switching. However, current systems may not support indicating to a UE that an SRS is being used to derive downlink channel state information (CSI) for an associated bandwidth, which may be in a different bandwidth, bandwidth part, carrier, frequency range, etc. Without knowing that an SRS is used to determine downlink CSI for an associated bandwidth, the UE may not consider channel conditions or interferences that may be present on the associated bandwidth when transmitting the SRS.

The techniques described herein support enhanced reference signal sounding based on an association of an SRS frequency resource to an associated bandwidth and a base station indicating that association. When configuring a UE for an SRS that is used to derive downlink CSI for an associated bandwidth, a base station may send an indication of how the SRS is used. For example, the base station may indicate that the SRS is used for deriving downlink CSI for the associated bandwidth. The indication may be explicit or implicit, indicating that CSI is derived on a bandwidth within the active bandwidth part (BWP), a different BWP, a different component carrier of the same radio frequency spectrum band, or a different component carrier of a different radio frequency spectrum band. Generally, the indication may indicate to the UE that the SRS is being used to derive CSI on a specific frequency alternatively, or additionally, to the frequency resource on which the SRS is transmitted. This may enable the UE to adjust the SRS transmission to align with the channel conditions on the other bandwidth. For example, the UE may apply a certain uplink precoding, make path-loss adjustments, or adjust a spatial transmit beam.

Aspects of the disclosure are initially described in the context of a wireless communications system. Aspects of the disclosure are further illustrated by and described with reference to apparatus diagrams, system diagrams, and flowcharts that relate to reference signal resource association options for enhanced sounding.

FIG. 1 illustrates an example of a wireless communications system 100 that supports reference signal resource association options for enhanced sounding in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, such as the wireless communications system 100, a UE 115 may transmit an SRS on an uplink channel to a base station 105, and the base station 105 may determine channel conditions for the uplink channel based on the SRS. A UE 115 may not be supported to transmit an SRS on all carriers or frequencies of the wireless communications system 100, but channel estimates on closely spaced component carriers may be correlated due to partial channel reciprocity. Therefore, SRS transmission on one component carrier may be used for downlink beamforming on other component carriers, such as adjacent component carriers or component carriers nearby in frequency.

UEs 115 and base stations 105 described herein may implement techniques to support enhanced reference signal sounding based on an association of an SRS frequency resource to an associated bandwidth and based on indications of that association. When configuring a UE 115 for an SRS that is used to derive downlink CSI for an associated bandwidth, a base station 105 may send an indication of how the SRS is used. Generally, the indication may indicate to the UE 115 that the SRS is being used to derive CSI on a specific frequency alternatively, or additionally, to the frequency resource on which the SRS is transmitted. The indication may be explicit or implicit, indicating that CSI is derived on a bandwidth within the active BWP, a different BWP, a different component carrier of the same radio frequency spectrum band, or a different component carrier of a different radio frequency spectrum band. This may enable the UE 115 to adjust the SRS transmission to align with the channel conditions on the other bandwidth. For example, the UE 115 may apply a certain uplink precoding, make path-loss adjustments, or adjust a spatial transmit beam.

Figure 2:
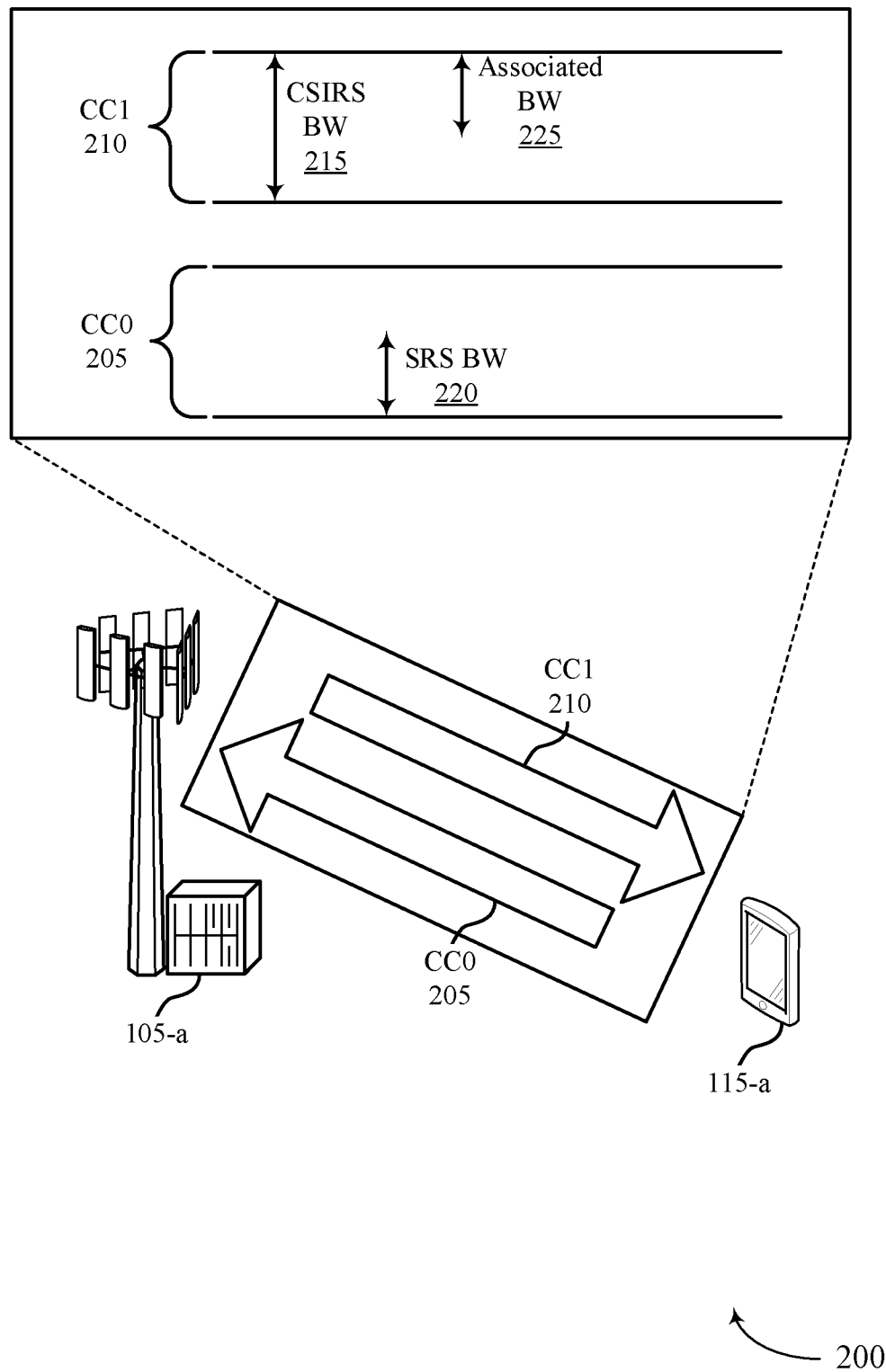
FIG. 2 illustrates an example of a wireless communication system that supports reference signal resource association options for enhanced sounding in accordance with aspects of the present disclosure.

FIG. 2 illustrates an example of a wireless communications system 200 that supports reference signal resource association options for enhanced sounding in accordance with aspects of the present disclosure. In some examples, the wireless communications system 200 may implement aspects of wireless communication system 100. The wireless communications system 200 may include UE 115-*a* and base station 105-*a*, which may be examples of corresponding devices described with reference to FIG. 1.

Base station 105-*a* may configure component carriers for UE 115-*a*. For example, UE 115-*a* may be configured with an uplink carrier 205 (e.g., CC0) and a downlink carrier 210 (e.g., CC1). While the communications between UE 115-*a* and base station 105-*a* are shown to be an example of FDD communications, the techniques described herein may also be applicable to TDD communications.

The wireless communications system 200 may support multiple different ways for providing channel measurements or determining channel state information. For example, base station 105-*a* may transmit a CSI-RS on a downlink channel to UE 115-*a*. UE 115-*a* may receive the CSI-RS, measure the downlink channel based on the CSI-RS, and provide a CSI report to base station 105-*a* based on the measurement. An SRS may be transmitted in another example of a channel measurement technique, where UE 115-*a* may transmit the SRS on an uplink channel to base station 105-*a*. Base station 105-*a* may receive the SRS and make channel measurements based on the SRS. Based on the channel measurements, base station 105-*a* may adjust channel configurations, mobility configurations, or other configurations, for UE 115-*a*.

SRS may have multiple uses for uplink communications. For example, SRS may be used for uplink beam management, codebook based uplink transmissions, and non-codebook based uplink transmissions. For beam management, UE 115-*a* may apply different transmit beams to different SRS resources, and base station 105-*a* may determine uplink transmit beams for UE 115-*a* based on the SRS. For a codebook based uplink transmission, base station 105-*a* may determine an SRS resource identifier (SRI), a transmit rank indicator (TRI), and a transmission precoder matrix indicator (TPMI) based on the SRS resources, and UE 115-*a* may determine a PUSCH transmission precoder based on feedback from base station 105-*a*. For a non-codebook based uplink transmission, base station 105-*a* may indicate a downlink CSI-RS for UE 115-*a* to calculate an uplink precoder, and UE 115-*a* may transmit beamformed SRS with candidate uplink precoders. UE 115-*a* may determine an uplink shared channel precoder and transmission rank based on a wideband SRI field in downlink control information from base station 105-*a*.

For some uplink communicates uses, there may be a linkage between a downlink CSI-RS and the uplink SRS for UE 115-*a* to generate an SRS precoder matrix based on the associated downlink CSI-RS. For example, some systems may support a linkage between a downlink CSI-RS and SRS for non-codebook based uplink transmissions and a spatial relation between a CSI-RS and SRS for uplink beam management. A CSI-RS (e.g., a non-zero power (NZP) CSI-RS) may be associated with an SRS for non-codebook based uplink communications to assist UE 115-*a* with deriving an uplink precoder. A UE 115 may be configured with a single NZP CSI-RS resource for the SRS resource set if a higher layer parameter (e.g., SRS-ResourceSet) is configured to indicate that the SRS is used for a non-codebook based uplink transmission (e.g., if SRS-ResourceSet is set to 'nonCodebook'). If the SRS is aperiodic and associated with an aperiodic NZP CSIRS resource, then the scheduling DCI may not be used for cross carrier or cross-BWP scheduling, and the CSI-RS may be located in the same slot as the SRS request field. If the UE 115 is configured with an aperiodic SRS associated with an aperiodic NZP CSI-RS resource, any of the TCI state configured in the scheduling component carrier may not be configured for a Type D QCL association. Further, when associating CSI-RS with SRS for non-codebook uplink transmissions, the CSI-RS resource may be configured on the same component carrier as the SRS resource.

In some cases, SRS may also be used for downlink communications. For example, an SRS may be transmitted for base station 105-*a* to obtain a downlink channel from SRS signals assuming a downlink/uplink channel reciprocity. In some cases, UE 115-*a* may be configured with multiple SRS resources which may be different in frequency, and UE 115-*a* may transmit SRS on the multiple SRS resources by applying an antenna switching. An antenna switching SRS may be used for base station 105-*a* to obtain, or achieve, a downlink channel by estimating the uplink SRS channel and using downlink/uplink channel reciprocity. Antenna switching for SRS may support UE 115-*a* to transmit an SRS on a component carrier where there is no configured uplink. For example, UE 115-*a* may be capable of sounding an antenna switching SRS on a downlink carrier where there is no configured uplink resources. Some conventional systems may not support a link between SRS and CSI-RS for downlink communications uses (e.g., for a base station 105 to estimate a downlink channel based on channel reciprocity).

UE 115-*a* may not be able to transmit an SRS on all carriers or frequencies of a system. For example, some carriers used by UE 115-*a* may be configured for downlink communications but not uplink communications. However, some channels configured for UE 115-*a* may have at least partial reciprocity, such that channel estimates on closely spaced component carriers may be correlated. Therefore, SRS transmission on one component carrier may be used for downlink beamforming on other component carriers, such as adjacent component carriers. In an example, SRS on one component carrier may be useful for downlink beamforming W1 vectors on the other adjacent component carriers, such as for Type II CSI. Similarly, in FDD systems, SRS based precoding vectors may be used as W1 vectors for downlink Type II CSI. In some cases, SRS-based CSI determination using partial reciprocity in FDD systems may provide performance similar to TDD reciprocity. The wireless communications system 200 may support enhancements for sounding techniques such that partial reciprocity enhancements can be provided for both FDD and multi-carrier TDD systems.

Therefore, in some systems, an antenna switching SRS may be transmitted for a base station 105 to obtain a downlink channel from SRS signals assuming DL-UL reciprocity. The base station 105 may indicate some uses for an SRS, such as if the SRS is used for beam management, codebook based or non-codebook based transmission, or antenna switching. However, the base station 105 of these systems may not be able to indicate to a UE 115 that an SRS is being used to derive downlink CSI for an associated bandwidth, which may be in another bandwidth, bandwidth part, carrier, frequency range, etc. Instead, antenna switching SRS of these conventional systems may always be in the same component carrier, and the UE 115 may not be aware that the antenna switching SRS is used to derive downlink CSI. Without knowing that the SRS is used for downlink CSI for the associated bandwidth, the SRS transmission may not consider channel conditions and interferences that may be present on the associated bandwidth.

By implementing techniques described herein, the wireless communications system 200 may support enhanced sounding procedures. Generally, the wireless communications system may support an association between a set of frequency resources used for SRS transmission and another set of frequency resources when a base station 105 uses the SRS transmission to acquire a downlink channel. The base station 105 may acquire channel state information for the associated frequency resources based on the SRS and a partial channel reciprocity between the set of frequency resources for SRS and the associated frequency resources.

When configuring UE 115-a for an SRS on an SRS resource 220 that is used to derive downlink CSI for an associated bandwidth 225, base station 105-a may send an indication that the SRS is used for deriving downlink CSI for the associated bandwidth. This may enable UE 115-a to adjust the SRS transmission to align conditions of the SRS resource 220 with the channel conditions on the associated bandwidth 225. For example, UE 115-a may apply a certain uplink precoding, make path-loss adjustments, or adjust a spatial transmit beam. For example, if the downlink carrier 210 is known to have highly directional interference, the SRS on the uplink carrier 205 may be precoded in directions orthogonal to the interference on the downlink carrier 210, such as on the SRS resources which may be configured to be used as downlink beam initiators (e.g., W1 beams) on the downlink carrier 210.

The SRS resource 220 may be associated with a bandwidth of a different carrier. For example, the SRS resource 220 may be on the uplink carrier 205, and the associated resource 225 may be on the downlink carrier 210. Base station 105-a may transmit an indication to UE 115-a that CSI is derived on a bandwidth within the active BWP, a different BWP, a different component carrier of the same band, or a different component carrier of a different band. In some cases, one or more bandwidths, bandwidth parts, component carriers, radio frequency spectrum bands, or CSI-RS bandwidths may be an example of the associated bandwidth 225. The associated bandwidth 225 may be an example of a CSI-RS bandwidth 215 or not. In some cases, the associated bandwidth 225 may at least partially overlap with the CSI-RS bandwidth 215, or the associated bandwidth 225 may not overlap with the CSI-RS bandwidth 215.

In some cases, SRS resources configured for downlink CSI acquisition (e.g., antenna switching SRS) may have the association to the associated bandwidth 225. For example, other SRS resources (e.g., not used for downlink CSI acquisition) may not have the association.

In some cases, if the SRS is associated with a NZP CSI-RS, both resources may be jointly configured or activated. Base station 105-a may send signaling which configures or activates both resources in a bundle. For example, base station 105-a may configure the SRS resource 220 and the CSI-RS bandwidth 215 with a single signaling. The resources may be jointly configured to ensure that there is a certain reciprocity (e.g., doppler, power delay profile (PDP), etc.) for periodic or semi-periodic cases. For example, base station 105-a may configure the CSI-RS and SRS to have a same periodicity and within a certain number of slots of respective configured slot-offsets. In some cases, semi-periodic CSI-RS and semi-periodic SRS may be activated by the same MAC CE command.

The association between the SRS resource 220 and the associated bandwidth 225 may be indicated explicitly or implicitly. In some cases, the SRS resource 220 may be associated with a bandwidth index or identifier, for which the SRS is used for CSI derivation. The association may be with one or multiple bandwidth parts identifiers, component carrier identifiers, or radio frequency spectrum band identifiers for performing downlink CSI acquisition. In some cases, the association may be with one or more NZP CSI-RS resources, CSI report configurations, or CSI-RS resource settings which may correspond to specific BWP identifiers, component carrier identifiers, or radio frequency spectrum band identifiers. The association may be indicated when UE 115-a is configured with resources for the SRS transmission, when UE 115-a is configured with resources for a CSI-RS, or both.

In some cases, a gap between the center bandwidth of the SRS resource 220 and the associated bandwidth 225 (or multiple associated bandwidths) may be within a UE-capability signaled gap. For example, UE 115-a may transmit an indicator of a UE capability, and the UE capability may indicate a maximum bandwidth gap for which UE 115-a can perform the association. In some cases, the UE capability may indicate whether UE 115-a can perform the association on a per-band basis.

In an example, base station 105-a may configure UE 115-a with the SRS resources 220 on the uplink carrier 205. Base station 105-a may send an indication of an association between the SRS resources 220 and the associated bandwidth 225. In some cases, base station 105-a may indicate that an SRS transmitted on the SRS resources 220 is used to acquire CSI for the associated bandwidth 225. UE 115-a may then determine a set of parameters for transmitting an SRS on the SRS resources 220. For example, UE 115-a may determine an uplink precoder to use for transmitting the SRS. In some cases, UE 115-a may adjust the SRS transmission such that the channel conditions for the SRS resource 220 reflect the channel conditions of the associated bandwidth 225. UE 115-a may then apply the determined transmission parameters and transmit the SRS on the SRS resource 220 (e.g., using an uplink precoder determined based on the association).

Base station 105-a may receive the SRS on the SRS resource 220. Base station 105-a may perform a channel estimation on the associated bandwidth 225 based on the SRS on the SRS resource 220. For example, based on a partial channel reciprocity between the SRS resource 220 and the associated bandwidth 225, the SRS on the SRS resource 220 may be used to acquire CSI for the associated bandwidth 225. In some cases, base station 105-a may perform CSI acquisition based on the association. For example, base station 105-*a* may account for some possible differences between the SRS resource 220 and the associated bandwidth 225).

Figure 3:
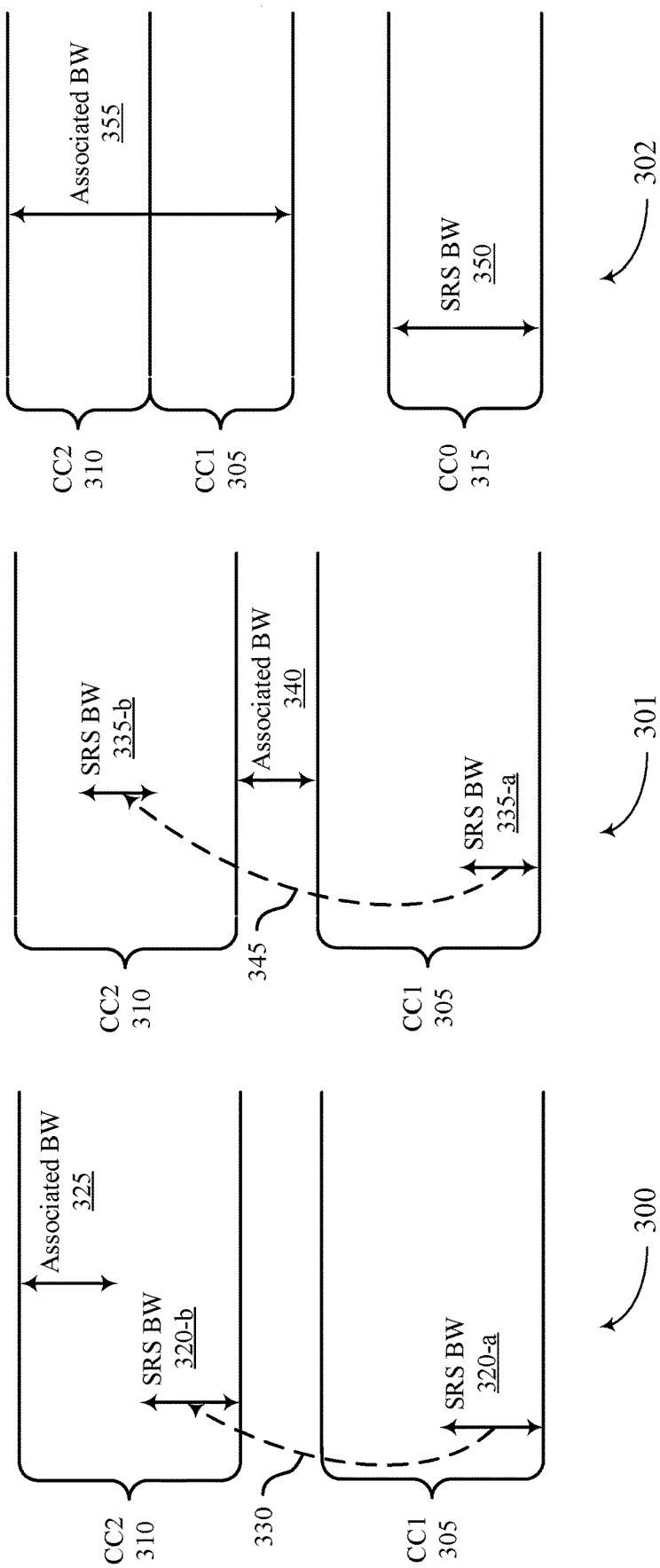
FIG. 3 illustrates examples of bandwidth association configurations that support reference signal resource association options for enhanced sounding in accordance with aspects of the present disclosure.

FIG. 3 illustrates examples of bandwidth association configurations 300, 301, and 302 that support reference signal resource association options for enhanced sounding in accordance with aspects of the present disclosure. In some examples, bandwidth association configurations 300, 301, and 302 may implement aspects of wireless communication system 100. The bandwidth association configurations 300, 301, and 302 may show wireless communications between a UE 115 and a base station 105 as described with reference to FIGS. 1 and 2.

The configurations generally describe an association between an SRS frequency resource and associated frequency resources, where the SRS frequency resource and the associated frequency resource may have at least partial channel reciprocity. The association may be configured such that a base station 105 can acquire CSI for the associated frequency resource based on a UE 115 transmitting an SRS on the SRS frequency resource by using partial frequency information. The base station 105 may transmit an explicit or implicit indication that the SRS is used to acquire CSI on the associated bandwidth. In some cases, the UE 115 may adjust the SRS transmission to align with the channel conditions on the associated bandwidth.

In some examples, there may be an asymmetric downlink/uplink configuration. For example, there may be different numbers of downlink carriers than uplink carriers. The bandwidth association configurations 300, 301, and 302 show different examples of SRS association configurations in asymmetric configurations.

The bandwidth association configuration 300 may include two downlink carriers, including CC1 305 and CC2 310. The bandwidth association configuration 300 may show an example of a first case of enhanced sounding in an asymmetrical configuration of two downlink carriers and one uplink carrier, where a UE 115 transmits SRS on both downlink carriers via an antenna switching 330. The UE 115 may be supported to transmit an antenna switching SRS on SRS bandwidths 320. For example, UE 115-*a* may be configured to transmit an SRS on SRS bandwidth 320-*a* in CC1 305 and SRS bandwidth 320-*b* in CC2 310 by performing the antenna switching 330. These SRS bandwidths 320 may be configured to be associated with an associated bandwidth 325. A base station 105 may acquire CSI for the associated bandwidth 325 based on the extrapolating sounded SRS on the SRS bandwidths 320.

The bandwidth association configuration 301 may include the two downlink carriers CC1 305 and CC2 310. The bandwidth association configuration 301 may show another example of the first case of enhanced sounding in an asymmetrical configuration of two downlink carriers and one uplink carrier, where a UE 115 transmits SRS on both downlink carriers via an antenna switching 345. The UE 115 may be supported to transmit an antenna switching SRS on SRS bandwidths 335. For example, UE 115-*a* may be configured to transmit an SRS on SRS bandwidth 335-*a* in CC1 305 and SRS bandwidth 335-*b* in CC2 310 by performing the antenna switching 345. These SRS bandwidths 335 may be configured to be associated with an associated bandwidth 340, which may be outside of the downlink carriers. A base station 105 may acquire CSI for the associated bandwidth 340 based on the interpolating sounded SRS on the SRS bandwidths 335.

The bandwidth association configuration 302 may include two downlink carriers, including CC1 305 and CC2 310, and one uplink carrier, CC0 315. The bandwidth association configuration 300 may show an example of a second case of enhanced sounding in an asymmetrical configuration of two downlink carriers and one uplink carrier, where a UE 115 transmits SRS on just the uplink carrier (e.g., CC0 315). UE 115-*a* may be configured to transmit an SRS on SRS bandwidth 350 in CC0 315, which may be associated with an associated bandwidth 355. In some cases, the associated bandwidth 355 may be outside of the uplink configured component carrier (e.g., CC0 315). In some examples, the associated bandwidth 355 may span across multiple component carriers (e.g., across CC1 305 and CC2 310). A base station 105 may acquire CSI for the associated bandwidth 355 based on the SRS transmitted on the SRS bandwidths 350.

Figure 4:
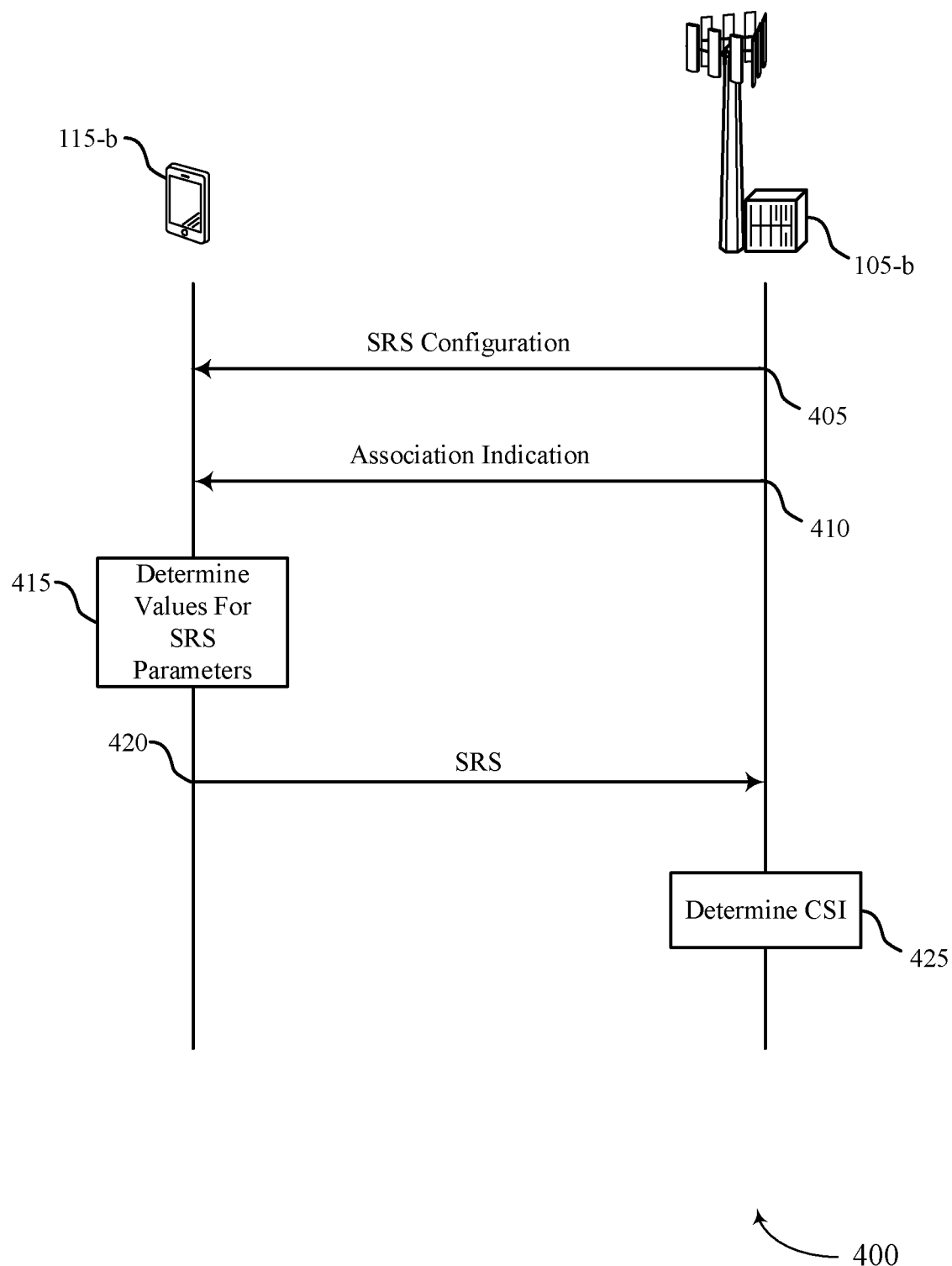
FIG. 4 illustrates an example of a process flow that supports reference signal resource association options for enhanced sounding in accordance with aspects of the present disclosure.

FIG. 4 illustrates an example of a process flow 400 that supports reference signal resource association options for enhanced sounding in accordance with aspects of the present disclosure. In some examples, process flow 400 may implement aspects of wireless communication system 100. Process flow 400 may include UE 115-*b* and base station 105-*b*, which may be respective examples of a UE 115 and a base station 105 as described herein.

At 405, base station 105-*b* may transmit, to UE 115-*b*, a configuration identifying a first set of frequency resources for UE 115-*a* to use to transmit an SRS to be used at least for downlink CSI acquisition. The first set of resources may be an example of an SRS resource or SRS frequency resource as described herein. At 410, base station 105-*b* may transmit an indication of an association between the first set of frequency resources and a second set of frequency resources used by the UE to acquire channel state information. The second set of frequency resources may be an example of an associated bandwidth as described herein.

In some cases, the first set of frequency resources and the second set of frequency resources may include different bandwidths, bandwidth parts, component carriers, radio frequency spectrum bands, or any combination thereof. In some examples, the second set of frequency resources may include one or more bandwidths, bandwidth parts, component carriers, or radio frequency spectrum bands. For example, the second set of frequency resources may include frequency resources which are not included in the first set of frequency resources. In some other examples, the second set of resources may be the superset of the first set of frequency resources. In some cases, base station 105-*b* may transmit a configuration indicating resources for a CSI-RS, where the indication of the association is based on the configuration for the CSI-RS.

At 415, UE 115-*b* may determine, based on the association, values for one or more SRS transmission parameters for the first set of frequency resources. In some cases, the transmission parameters may be determined based on a measuring of channel quality or an interference, or both, of a received physical channel or a received physical signal, or both, within the second set of frequency resources. At 420, UE 115-*b* may transmit the SRS on the first set of frequency resources based on the determined one or more values. In some examples, UE 115-*b* may determine an uplink precoder for transmitting an SRS based on the association between the first set of frequency resources and the second set of frequency resources. UE 115-*b* may apply the uplink precoder when transmitting the SRS on the first set of frequency resources.

Base station 105-*b* may receive the SRS on the first set of frequency resources based on the association. Base station 105-*b* may determine, based on the received SRS, channel state information for at least the second set of frequency resources. In some cases, base station 105-b may determine the channel state information for the second set of frequency resources based on an at least partial channel reciprocity between the first set of frequency resources and the second set of frequency resources.

Figure 5:
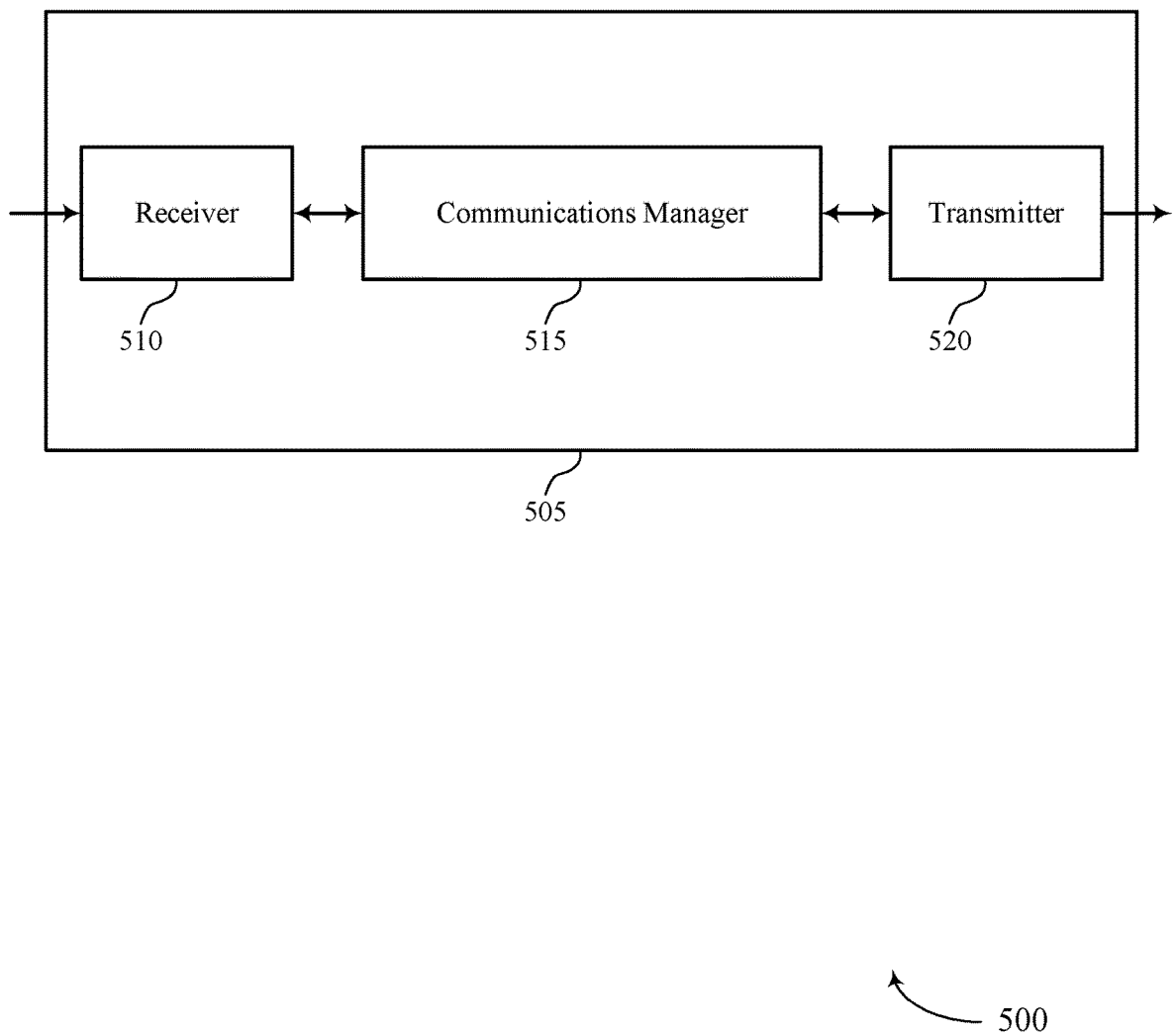
FIGS. 5 and 6 show block diagrams of devices that support reference signal resource association options for enhanced sounding in accordance with aspects of the present disclosure.

FIG. 5 shows a block diagram 500 of a device 505 that supports reference signal resource association options for enhanced sounding in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to reference signal resource association options for enhanced sounding, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a configuration identifying a first set of frequency resources for transmitting a sounding reference signal to be used at least for downlink channel state information acquisition, receive an indication of an association between the configuration for the sounding reference signal and a second set of frequency resources, determine, based on the association, values for one or more sounding reference signal transmission parameters for the first set of frequency resources, and transmit the sounding reference signal on the first set of frequency resources based on the determined one or more values. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
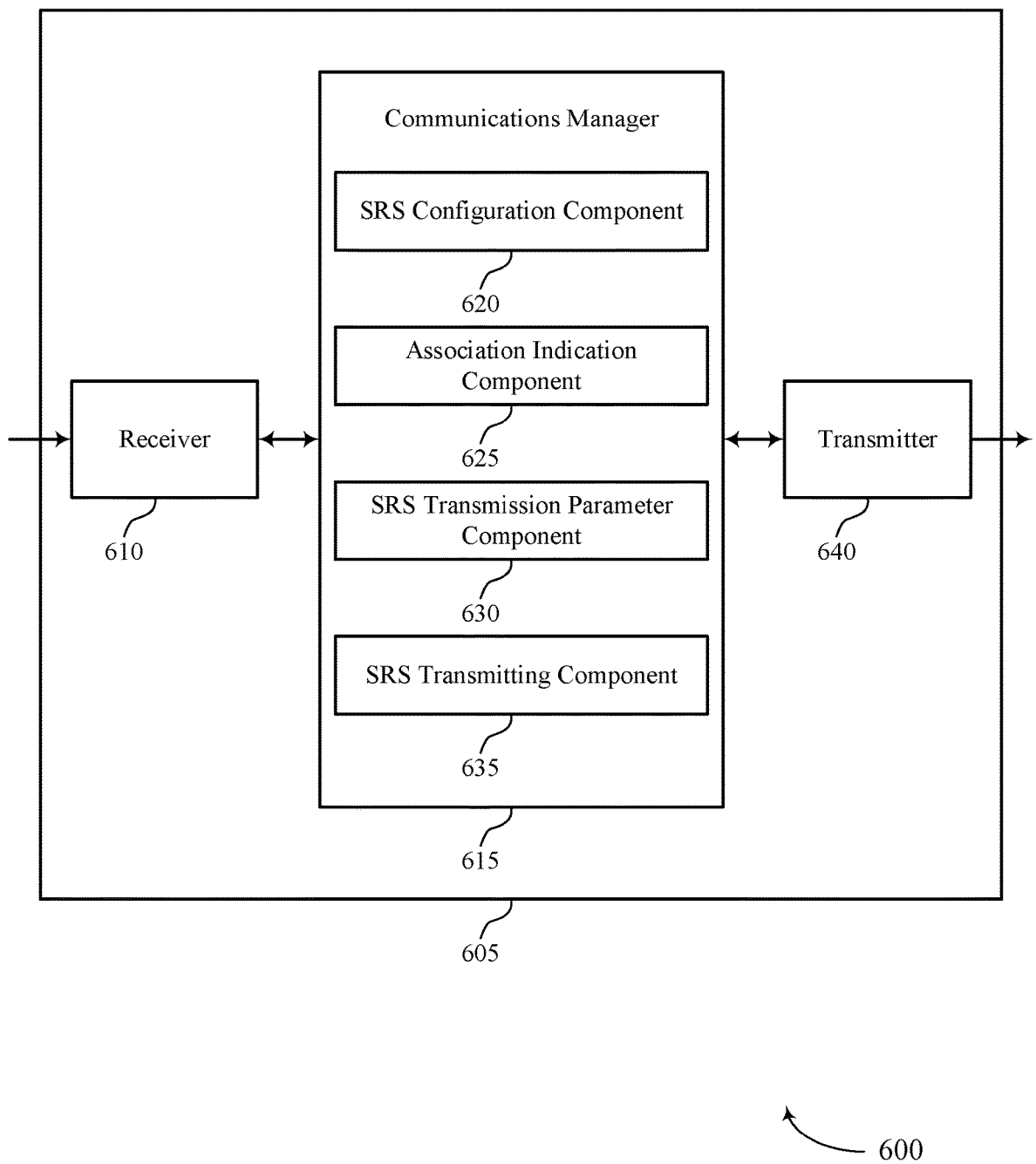

FIG. 6 shows a block diagram 600 of a device 605 that supports reference signal resource association options for enhanced sounding in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to reference signal resource association options for enhanced sounding, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an SRS configuration component 620, an association indication component 625, an SRS transmission parameter component 630, and an SRS transmitting component 635. The communications manager 615 may be an example of aspects of the communications manager 810 described herein.

The SRS configuration component 620 may receive a configuration identifying a first set of frequency resources for transmitting a sounding reference signal to be used at least for downlink channel state information acquisition. The association indication component 625 may receive an indication of an association between the configuration for the sounding reference signal and a second set of frequency resources. The SRS transmission parameter component 630 may determine, based on the association, values for one or more sounding reference signal transmission parameters for the first set of frequency resources. The SRS transmitting component 635 may transmit the sounding reference signal on the first set of frequency resources based on the determined one or more values.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
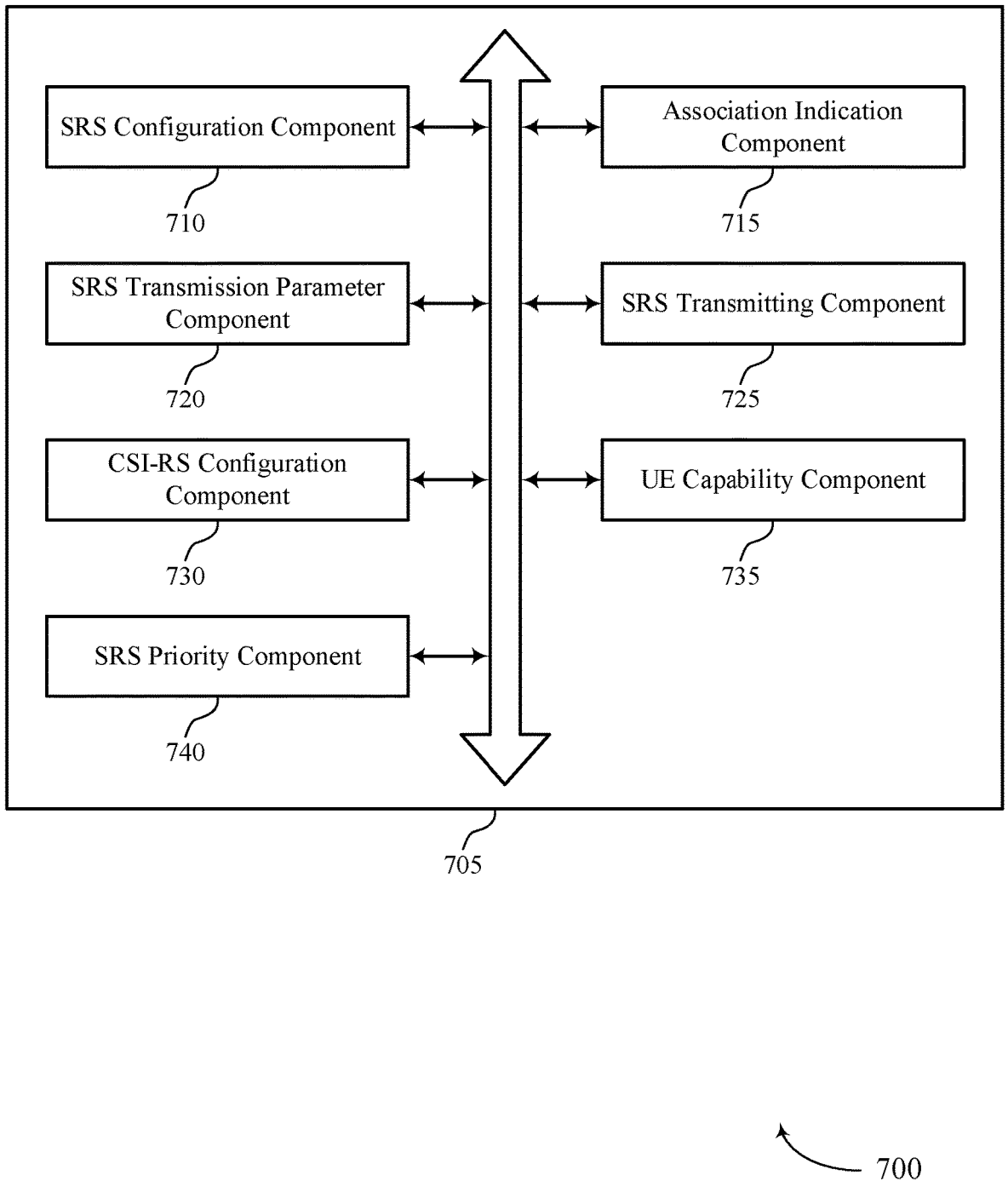
FIG. 7 shows a block diagram of a communications manager that supports reference signal resource association options for enhanced sounding in accordance with aspects of the present disclosure.

FIG. 7 shows a block diagram 700 of a communications manager 705 that supports reference signal resource association options for enhanced sounding in accordance with aspects of the present disclosure. The communications manager 705 may be an example of aspects of a communications manager 515, a communications manager 615, or a communications manager 810 described herein. The communications manager 705 may include an SRS configuration component 710, an association indication component 715, an SRS transmission parameter component 720, an SRS transmitting component 725, a CSI-RS configuration component 730, an UE capability component 735, and an SRS priority component 740. Each of these modules may communicate, directly or indirectly, with one another (e.g., via one or more buses).

The SRS configuration component 710 may receive a configuration identifying a first set of frequency resources for transmitting a sounding reference signal to be used at least for downlink channel state information acquisition. The association indication component 715 may receive an indication of an association between the configuration for the sounding reference signal and a second set of frequency resources.

In some examples, the association indication component 715 may identify that the first set of frequency resources and the second set of frequency resources are in a same bandwidth part, different bandwidth parts, different component carriers of a same radio frequency spectrum band, or different component carriers of different radio frequency spectrum bands. In some cases, the second set of frequency resources includes frequency resources that are not included in the first set of frequency resources. In some cases, the second set of frequency resources is a superset of the first set of frequency resources.

In some cases, the first set of frequency resources and the second set of frequency resources include different bandwidths, bandwidth parts, component carriers, radio frequency spectrum bands, or any combination thereof. In some cases, the indication of the association between the first set of frequency resources and the second set of frequency resources is received with the configuration identifying the first set of frequency resources for transmitting the sounding reference signal.

The SRS transmission parameter component 720 may determine, based on the association, values for one or more sounding reference signal transmission parameters for the first set of frequency resources. In some examples, the SRS transmission parameter component 720 may determine one or more uplink precoders for transmitting the sounding reference signal based on the association between the first set of frequency resources and the second set of frequency resources. In some examples, the SRS transmission parameter component 720 may apply the one or more uplink precoders when transmitting the sounding reference signal on the first set of frequency resources. In some cases, the determining of the transmission parameters is based at least in part of measuring a channel quality or an interference, or both, of a received physical channel or a received physical signal, or both, within the second set of frequency resources. In some cases, the one or more sounding reference signal transmission parameters include one or more uplink precoders, an uplink transmit power, one or more spatial transmit directions, or any combination thereof.

The SRS transmitting component 725 may transmit the sounding reference signal on the first set of frequency resources based on the determined one or more values. In some cases, the first set of frequency resources correspond to a first subset of resources within a first downlink component carrier and a second subset of resources within a second downlink component carrier, and where a set of transmission occasions of the sounding reference signal are transmitted on the first downlink component carrier and the second downlink component carrier based on a sounding reference signal carrier switching indication triggered through a third uplink component carrier. In some cases, the second set of frequency resources include a bandwidth that is a higher frequency than the subset of resources of the first downlink component carrier, and the bandwidth is lower in frequency than the subset of resources of the second downlink component carrier.

The CSI-RS configuration component 730 may receive a configuration identifying resources to use to receive a channel state information reference signal, where the indication of the association is based on the configuration for the channel state information reference signal. In some examples, the CSI-RS configuration component 730 may receive the channel state information reference signal, where the values for the one or more sounding reference signal transmission parameters are determined based on the received channel state information reference signal.

In some examples, the CSI-RS configuration component 730 may receive, jointly with the configuration identifying the first set of frequency resources, a configuration for one or more channel state information reference signals associated with the second set of frequency resources, where the association between the first set of frequency resources and the second set of frequency resources is determined based on the jointly received configurations. In some examples, the CSI-RS configuration component 730 may receive a media access control control element activating semi-persistent occasions for the first set of frequency resources and the second set of frequency resources.

The UE capability component 735 may transmit an indication of a UE capability associated with a frequency domain gap between the first set of frequency resources and the second set of frequency resources. The SRS priority component 740 may identify that the sounding reference signal has a higher priority than other sounding reference signals based on the configuration of the second set of frequency resources and the sounding reference signal being used for downlink channel state information acquisition. In some examples, determining that the second set of frequency resources includes frequency resources within one or more different bandwidth parts, or within one or multiple component carriers, or frequency resources that are not part of the first set of frequency resources, where the sounding reference signal is identified as having the higher priority than the other sounding reference signals based on the second set of frequency resources including the frequency resources within the one or more different bandwidth parts, or within the one or multiple component carrier, or the frequency resources that are not part of the first set of frequency resources. In some cases, the higher priority is associated with a higher priority with respect to a transmission power reduction due to carrier aggregation power scaling prioritization.

Figure 8:
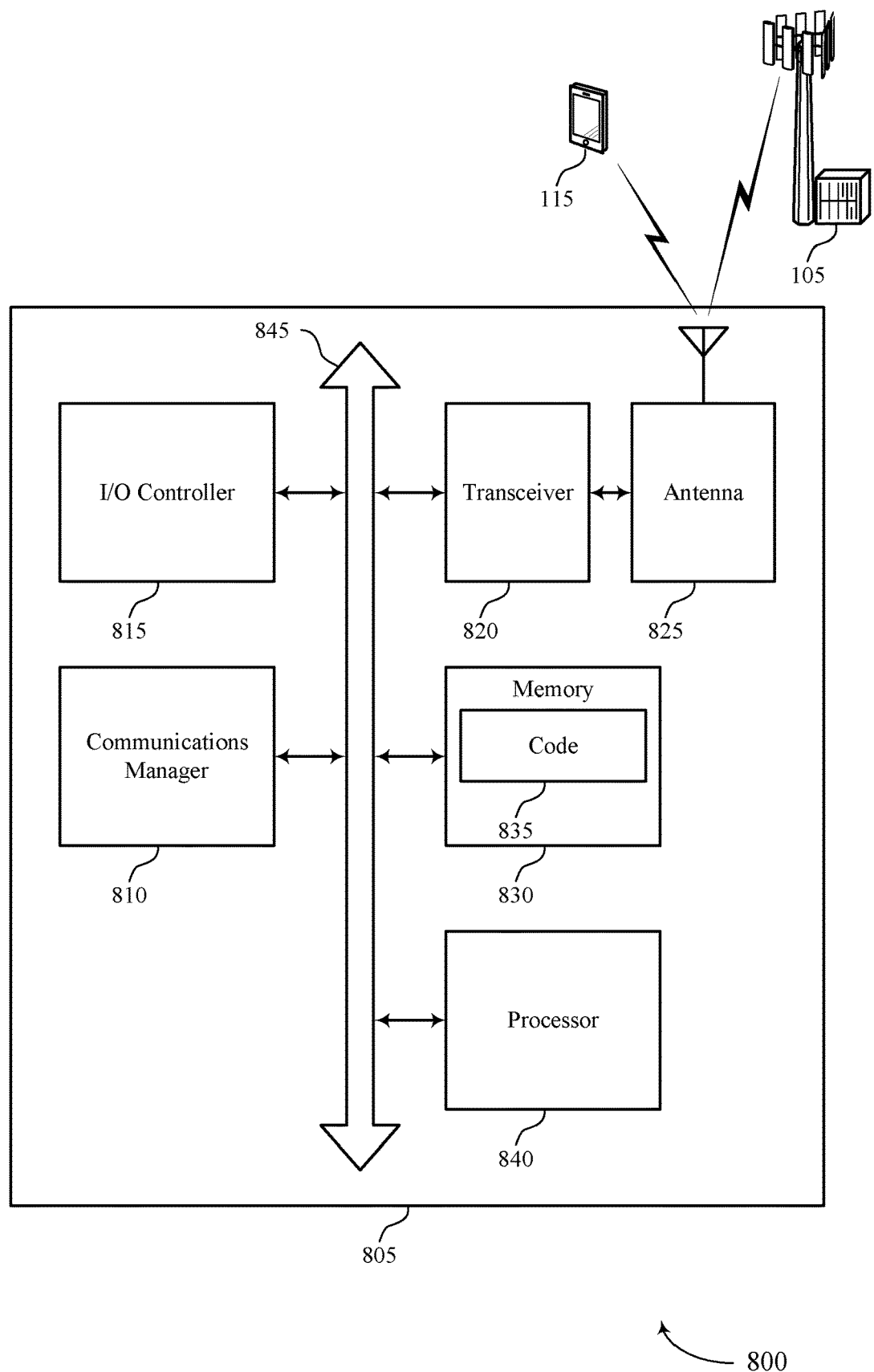
FIG. 8 shows a diagram of a system including a device that supports reference signal resource association options for enhanced sounding in accordance with aspects of the present disclosure.

FIG. 8 shows a diagram of a system 800 including a device 805 that supports reference signal resource association options for enhanced sounding in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration identifying a first set of frequency resources for transmitting a sounding reference signal to be used at least for downlink channel state information acquisition, receive an indication of an association between the configuration for the sounding reference signal and a second set of frequency resources, determine, based on the association, values for one or more sounding reference signal transmission parameters for the first set of frequency resources, and transmit the sounding reference signal on the first set of frequency resources based on the determined one or more values.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reference signal resource association options for enhanced sounding).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
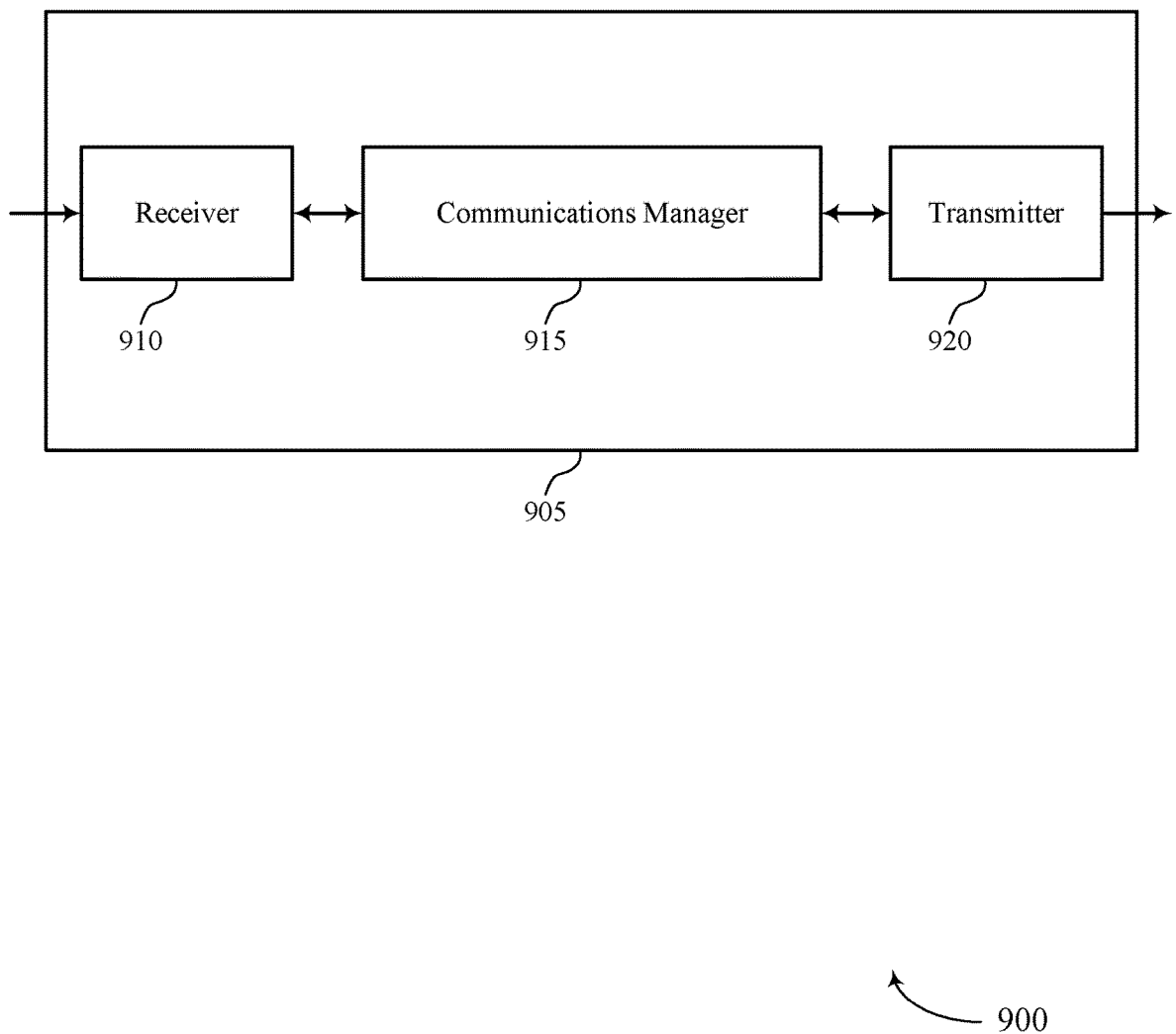
FIGS. 9 and 10 show block diagrams of devices that support reference signal resource association options for enhanced sounding in accordance with aspects of the present disclosure.

FIG. 9 shows a block diagram 900 of a device 905 that supports reference signal resource association options for enhanced sounding in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reference signal resource association options for enhanced sounding, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a configuration identifying a first set of frequency resources for the UE to use to transmit a sounding reference signal to be used at least for downlink channel state information acquisition, transmit an indication of an association between the first set of frequency resources and a second set of frequency resources, receive, from the UE, the sounding reference signal on the first set of frequency resources based on the association, and determine, based on the received sounding reference signal, channel state information for at least the second set of frequency resources. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
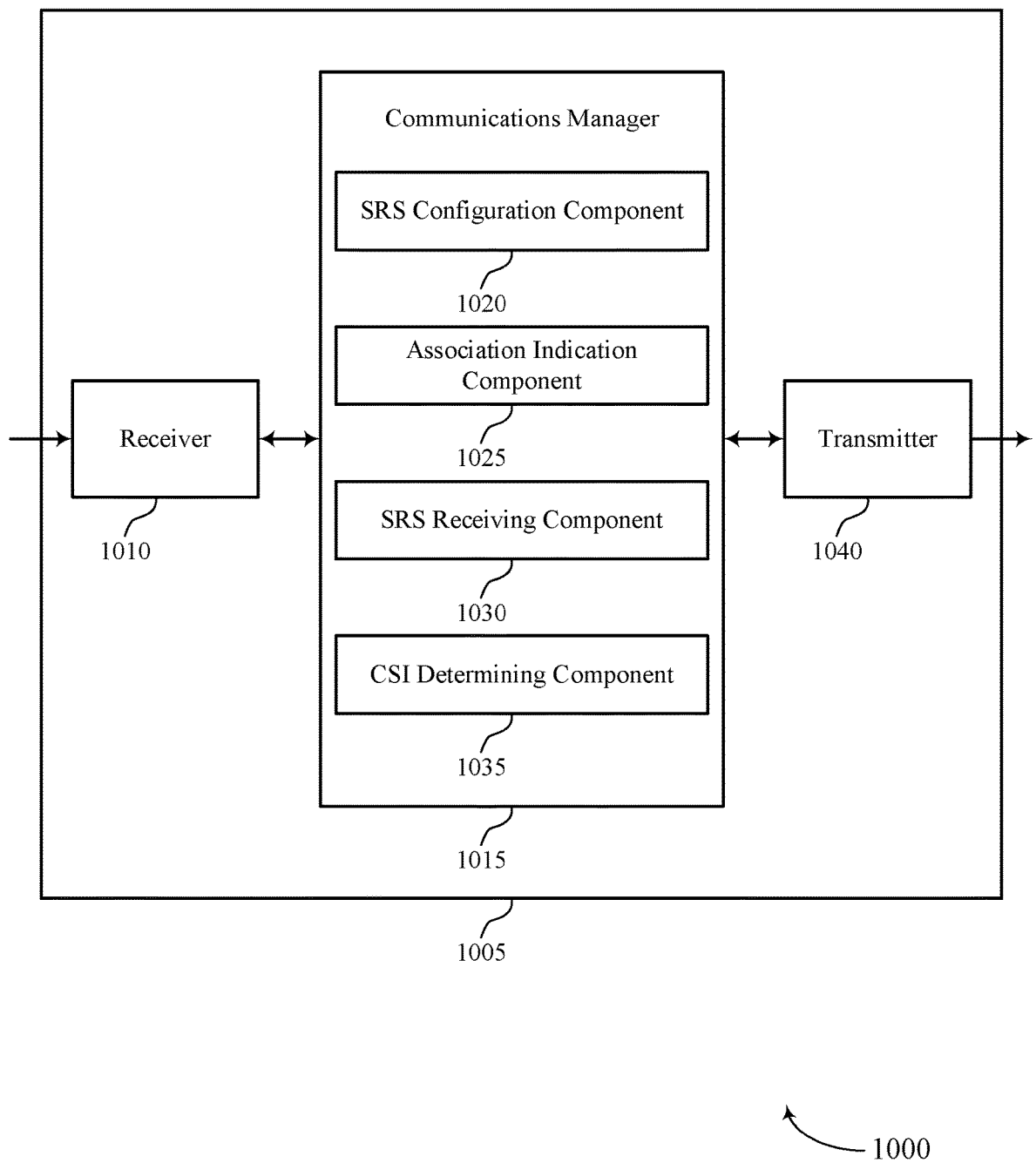

FIG. 10 shows a block diagram 1000 of a device 1005 that supports reference signal resource association options for enhanced sounding in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to reference signal resource association options for enhanced sounding, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an SRS configuration component 1020, an association indication component 1025, an SRS receiving component 1030, and a CSI determining component 1035. The communications manager 1015 may be an example of aspects of the communications manager 1210 described herein.

The SRS configuration component 1020 may transmit, to a UE, a configuration identifying a first set of frequency resources for the UE to use to transmit a sounding reference signal to be used at least for downlink channel state information acquisition. The association indication component 1025 may transmit an indication of an association between the first set of frequency resources and a second set of frequency resources. The SRS receiving component 1030 may receive, from the UE, the sounding reference signal on the first set of frequency resources based on the association. The CSI determining component 1035 may determine, based on the received sounding reference signal, channel state information for at least the second set of frequency resources.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
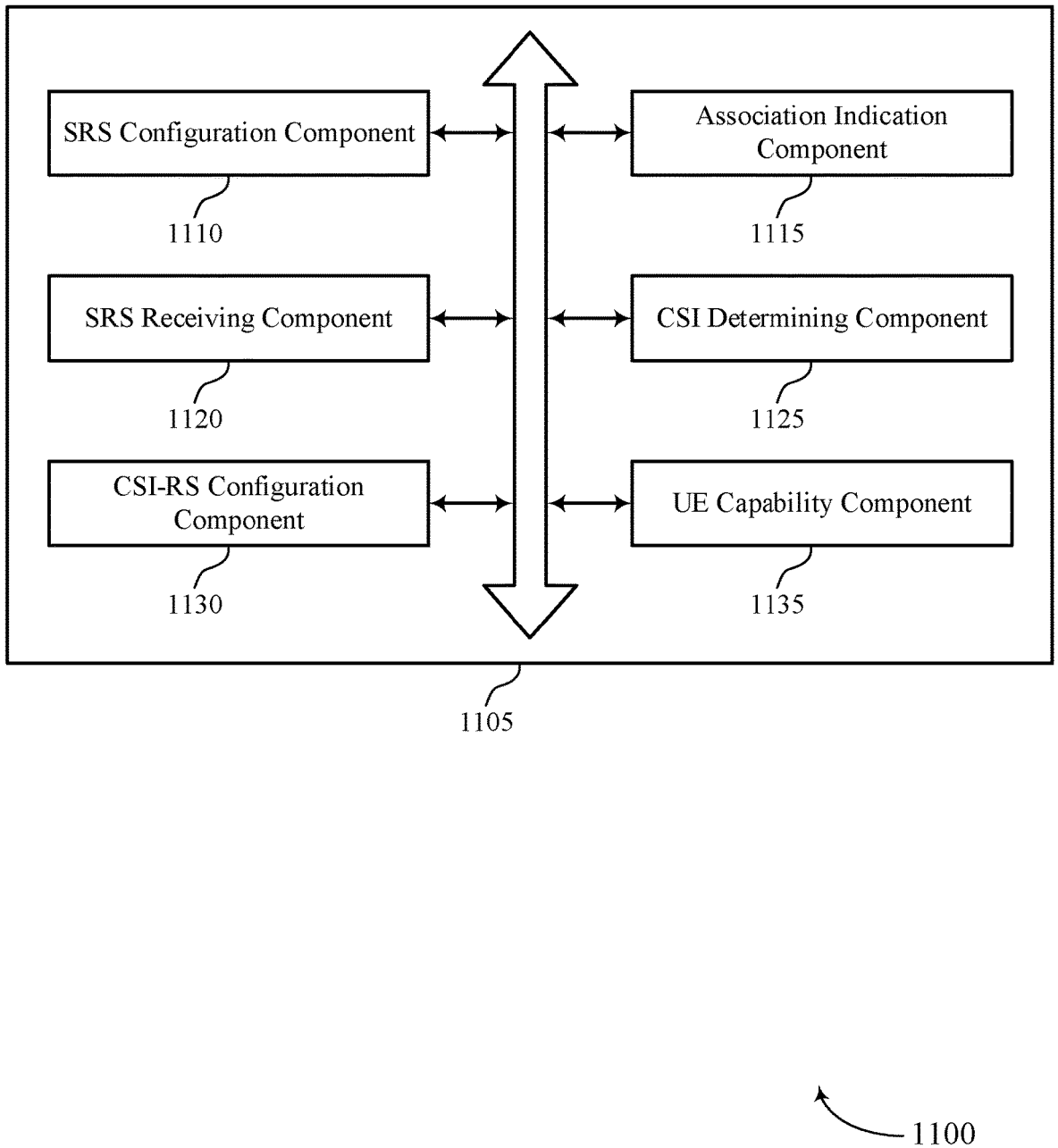
FIG. 11 shows a block diagram of a communications manager that supports reference signal resource association options for enhanced sounding in accordance with aspects of the present disclosure.

FIG. 11 shows a block diagram 1100 of a communications manager 1105 that supports reference signal resource association options for enhanced sounding in accordance with aspects of the present disclosure. The communications manager 1105 may be an example of aspects of a communications manager 915, a communications manager 1015, or a communications manager 1210 described herein. The communications manager 1105 may include an SRS configuration component 1110, an association indication component 1115, an SRS receiving component 1120, a CSI determining component 1125, a CSI-RS configuration component 1130, and an UE capability component 1135. Each of these modules may communicate, directly or indirectly, with one another (e.g., via one or more buses).

The SRS configuration component 1110 may transmit, to a UE, a configuration identifying a first set of frequency resources for the UE to use to transmit a sounding reference signal to be used at least for downlink channel state information acquisition.

The association indication component 1115 may transmit an indication of an association between the first set of frequency resources and a second set of frequency resources. In some cases, the first set of frequency resources and the second set of frequency resources include different bandwidths, bandwidth parts, component carriers, radio frequency spectrum bands, or any combination thereof. In some cases, the association indicates that the first set of frequency resources and the second set of frequency resources are in a same bandwidth part, different bandwidth parts, different component carriers of a same radio frequency spectrum band, or different component carriers of different radio frequency spectrum band. In some cases, the indication of the association between the first set of frequency resources and the second set of frequency resources is received with the configuration identifying the first set of frequency resources for transmitting the sounding reference signal.

The SRS receiving component 1120 may receive, from the UE, the sounding reference signal on the first set of frequency resources based on the association. In some cases, the first set of frequency resources includes a first uplink component carrier and second downlink component carrier, and where the sounding reference signal is received on the first uplink component carrier and the second downlink component carrier based on a sounding reference signal carrier switching.

The CSI determining component 1125 may determine, based on the received sounding reference signal, channel state information for at least the second set of frequency resources. The CSI-RS configuration component 1130 may transmit a configuration indicating resources for a channel state information reference signal, where the indication of the association is based on the configuration for the channel state information reference signal.

In some examples, the CSI-RS configuration component 1130 may transmit, jointly with the configuration identifying the first set of frequency resources, a configuration for one or more channel state information reference signals associated with the second set of frequency resources, where the association between the first set of frequency resources and the second set of frequency resources is implicitly indicated based on the jointly transmitted configurations. In some examples, the CSI-RS configuration component 1130 may transmit a media access control control element to activate semi-persistent occasions for the first set of frequency resources and the second set of frequency resources. The UE capability component 1135 may receive an indication of a UE capability associated with a gap between the first set of frequency resources and the second set of frequency resources, where the configuration identifying the first set of frequency resources is based on the UE capability.

Figure 12:
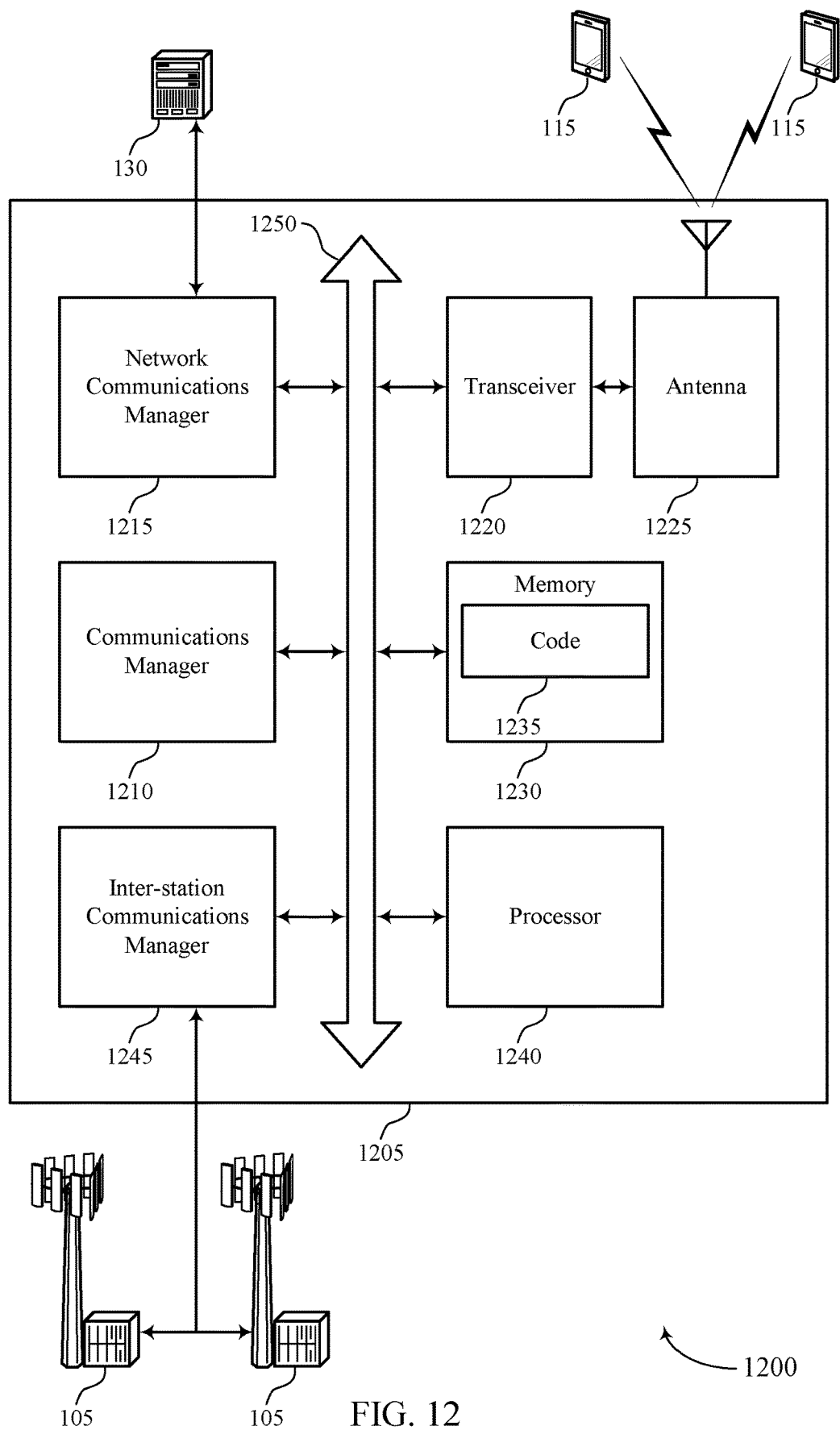
FIG. 12 shows a diagram of a system including a device that supports reference signal resource association options for enhanced sounding in accordance with aspects of the present disclosure.

FIG. 12 shows a diagram of a system 1200 including a device 1205 that supports reference signal resource association options for enhanced sounding in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a configuration identifying a first set of frequency resources for the UE to use to transmit a sounding reference signal to be used at least for downlink channel state information acquisition, transmit an indication of an association between the first set of frequency resources and a second set of frequency resources, receive, from the UE, the sounding reference signal on the first set of frequency resources based on the association, and determine, based on the received sounding reference signal, channel state information for at least the second set of frequency resources.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting reference signal resource association options for enhanced sounding).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
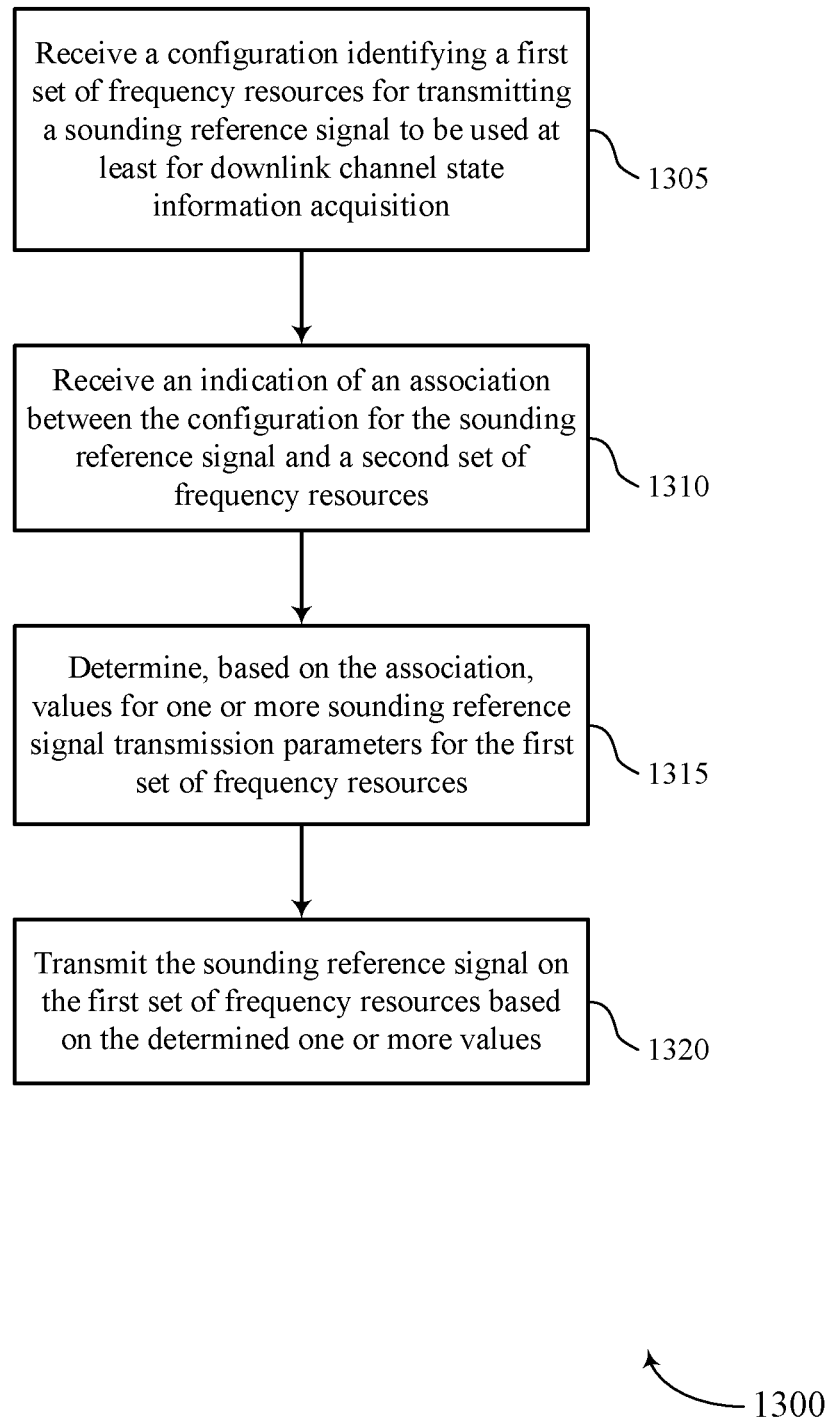
FIGS. 13 through 16 show flowcharts illustrating methods that support reference signal resource association options for enhanced sounding in accordance with aspects of the present disclosure.

FIG. 13 shows a flowchart illustrating a method 1300 that supports reference signal resource association options for enhanced sounding in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration identifying a first set of frequency resources for transmitting a sounding reference signal to be used at least for downlink channel state information acquisition. The operations of 1305 may be performed according to the methods described herein. In some examples, aspects of the operations of 1305 may be performed by an SRS configuration component as described with reference to FIGS. 5 through 8.

At 1310, the UE may receive an indication of an association between the configuration for the sounding reference signal and a second set of frequency resources. The operations of 1310 may be performed according to the methods described herein. In some examples, aspects of the operations of 1310 may be performed by an association indication component as described with reference to FIGS. 5 through 8.

At 1315, the UE may determine, based on the association, values for one or more sounding reference signal transmission parameters for the first set of frequency resources. The operations of 1315 may be performed according to the methods described herein. In some examples, aspects of the operations of 1315 may be performed by an SRS transmission parameter component as described with reference to FIGS. 5 through 8.

At 1320, the UE may transmit the sounding reference signal on the first set of frequency resources based on the determined one or more values. The operations of 1320 may be performed according to the methods described herein. In some examples, aspects of the operations of 1320 may be performed by an SRS transmitting component as described with reference to FIGS. 5 through 8.

Figure 14:
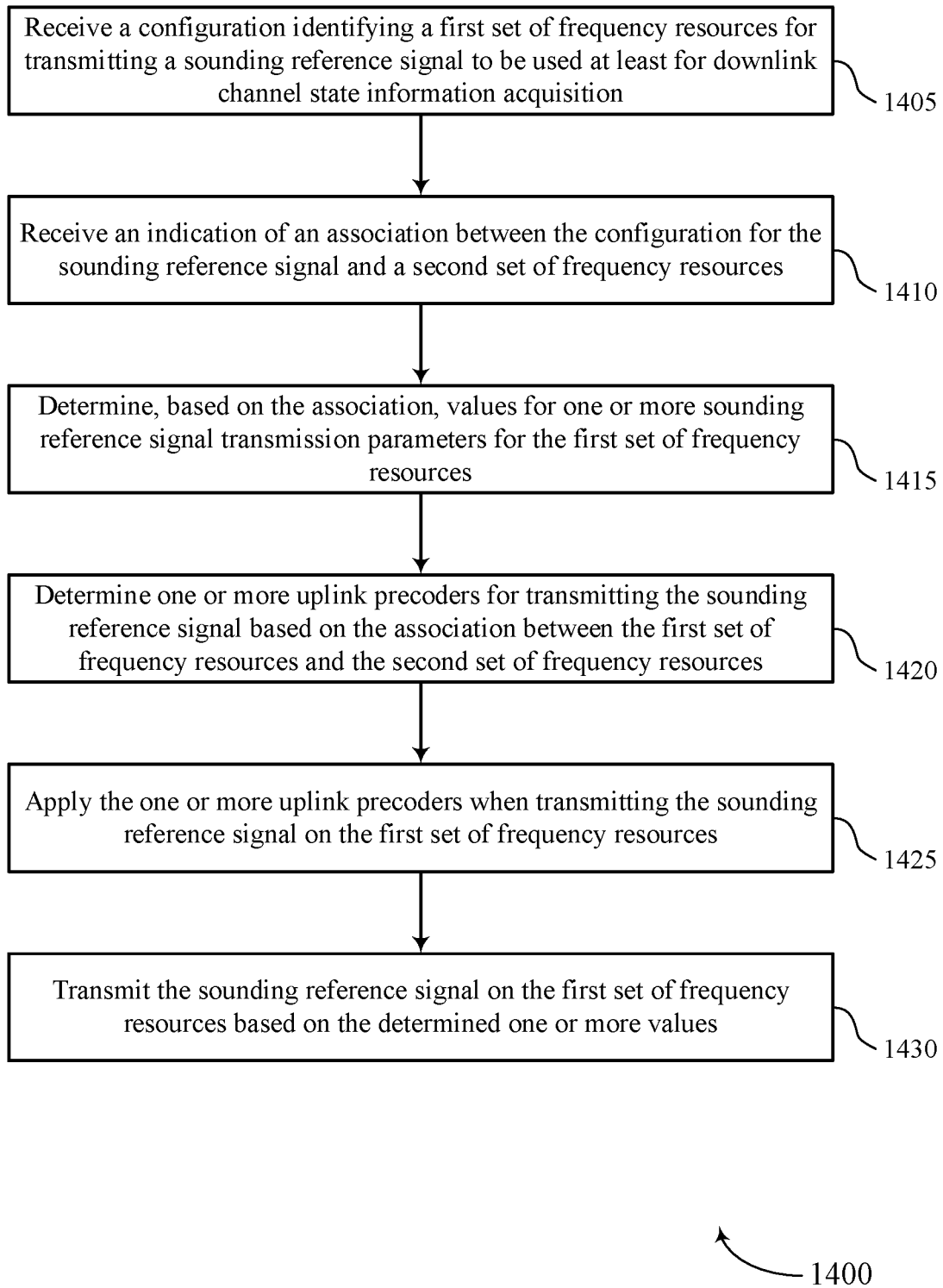

FIG. 14 shows a flowchart illustrating a method 1400 that supports reference signal resource association options for enhanced sounding in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a configuration identifying a first set of frequency resources for transmitting a sounding reference signal to be used at least for downlink channel state information acquisition. The operations of 1405 may be performed according to the methods described herein. In some examples, aspects of the operations of 1405 may be performed by an SRS configuration component as described with reference to FIGS. 5 through 8.

At 1410, the UE may receive an indication of an association between the configuration for the sounding reference signal and a second set of frequency resources. The operations of 1410 may be performed according to the methods described herein. In some examples, aspects of the operations of 1410 may be performed by an association indication component as described with reference to FIGS. 5 through 8.

At 1415, the UE may determine, based on the association, values for one or more sounding reference signal transmission parameters for the first set of frequency resources. The operations of 1415 may be performed according to the methods described herein. In some examples, aspects of the operations of 1415 may be performed by an SRS transmission parameter component as described with reference to FIGS. 5 through 8.

At 1420, the UE may determine one or more uplink precoders for transmitting the sounding reference signal based on the association between the first set of frequency resources and the second set of frequency resources. The operations of 1420 may be performed according to the methods described herein. In some examples, aspects of the operations of 1420 may be performed by an SRS transmission parameter component as described with reference to FIGS. 5 through 8.

At 1425, the UE may apply the one or more uplink precoders when transmitting the sounding reference signal on the first set of frequency resources. The operations of 1425 may be performed according to the methods described herein. In some examples, aspects of the operations of 1425 may be performed by an SRS transmission parameter component as described with reference to FIGS. 5 through 8.

At 1430, the UE may transmit the sounding reference signal on the first set of frequency resources based on the determined one or more values. The operations of 1430 may be performed according to the methods described herein. In some examples, aspects of the operations of 1430 may be performed by an SRS transmitting component as described with reference to FIGS. 5 through 8.

Figure 15:
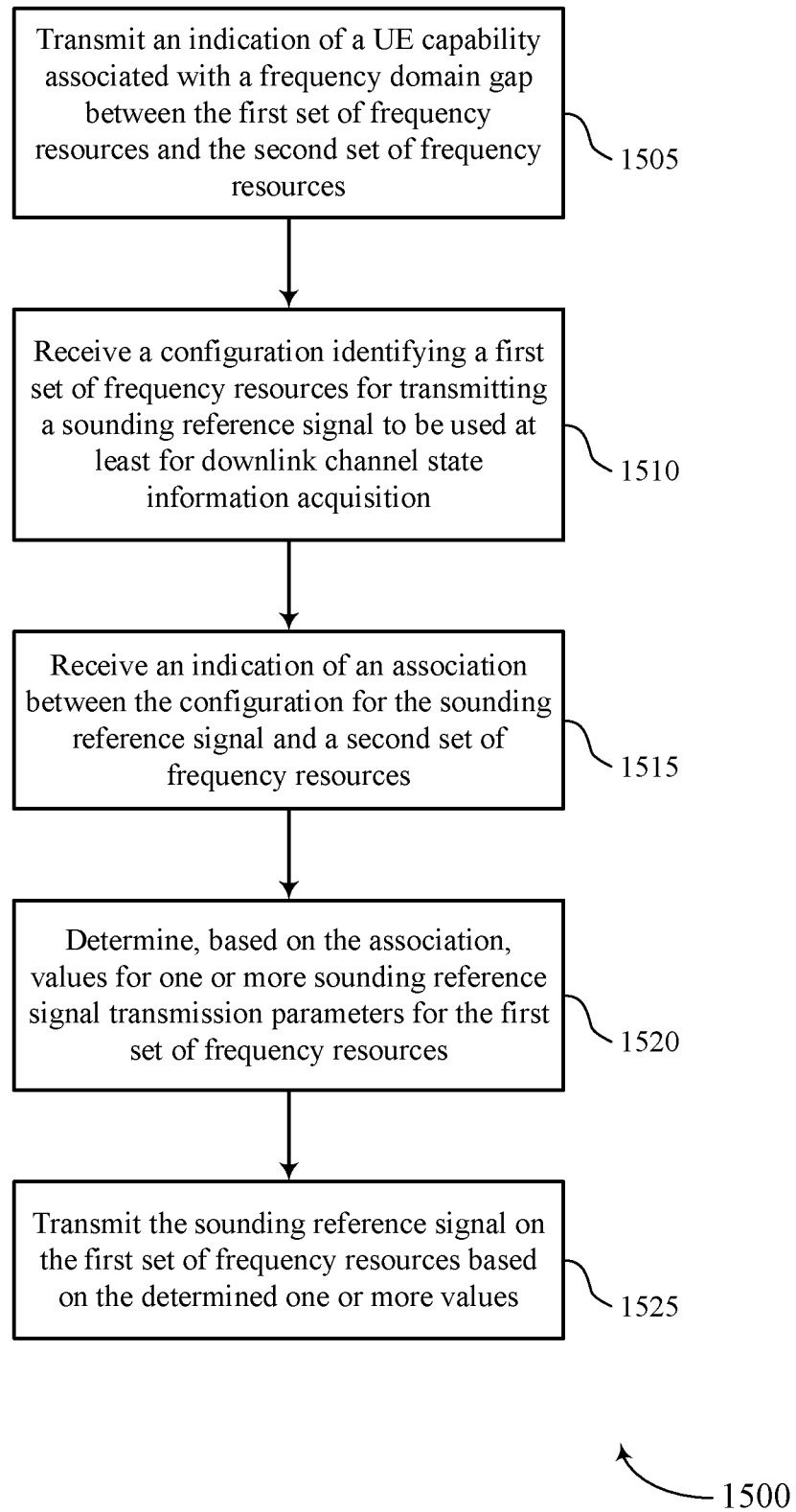

FIG. 15 shows a flowchart illustrating a method 1500 that supports reference signal resource association options for enhanced sounding in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit an indication of a UE capability associated with a frequency domain gap between the first set of frequency resources and the second set of frequency resources. The operations of 1505 may be performed according to the methods described herein. In some examples, aspects of the operations of 1505 may be performed by a UE capability component as described with reference to FIGS. 5 through 8.

At 1510, the UE may receive a configuration identifying a first set of frequency resources for transmitting a sounding reference signal to be used at least for downlink channel state information acquisition. The operations of 1510 may be performed according to the methods described herein. In some examples, aspects of the operations of 1510 may be performed by an SRS configuration component as described with reference to FIGS. 5 through 8.

At 1515, the UE may receive an indication of an association between the configuration for the sounding reference signal and a second set of frequency resources. The operations of 1515 may be performed according to the methods described herein. In some examples, aspects of the operations of 1515 may be performed by an association indication component as described with reference to FIGS. 5 through 8.

At 1520, the UE may determine, based on the association, values for one or more sounding reference signal transmission parameters for the first set of frequency resources. The operations of 1520 may be performed according to the methods described herein. In some examples, aspects of the operations of 1520 may be performed by an SRS transmission parameter component as described with reference to FIGS. 5 through 8.

At 1525, the UE may transmit the sounding reference signal on the first set of frequency resources based on the determined one or more values. The operations of 1525 may be performed according to the methods described herein. In some examples, aspects of the operations of 1525 may be performed by an SRS transmitting component as described with reference to FIGS. 5 through 8.

Figure 16:
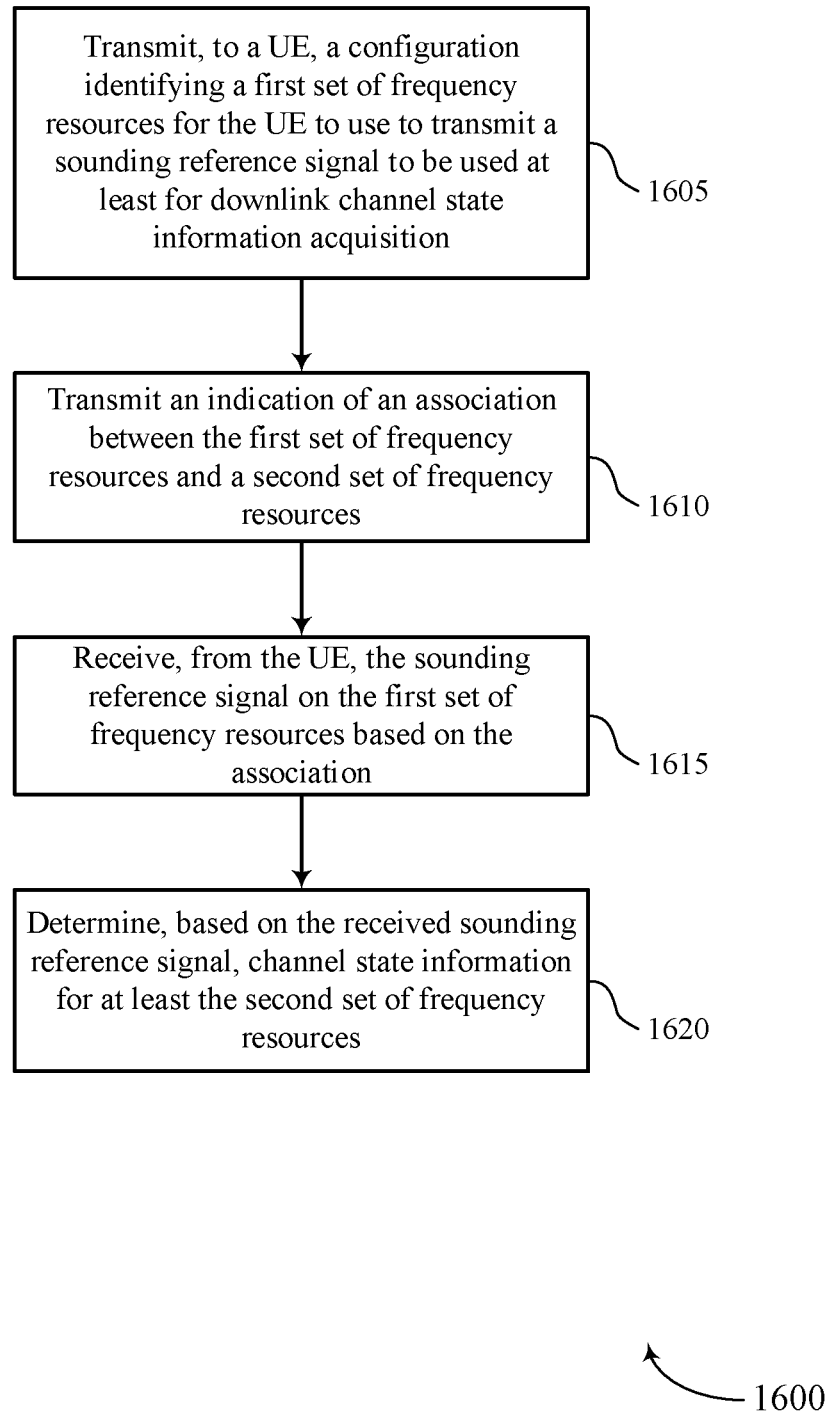

FIG. 16 shows a flowchart illustrating a method 1600 that supports reference signal resource association options for enhanced sounding in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a configuration identifying a first set of frequency resources for the UE to use to transmit a sounding reference signal to be used at least for downlink channel state information acquisition. The operations of 1605 may be performed according to the methods described herein. In some examples, aspects of the operations of 1605 may be performed by an SRS configuration component as described with reference to FIGS. 9 through 12.

At 1610, the base station may transmit an indication of an association between the first set of frequency resources and a second set of frequency resources. The operations of 1610 may be performed according to the methods described herein. In some examples, aspects of the operations of 1610 may be performed by an association indication component as described with reference to FIGS. 9 through 12.

At 1615, the base station may receive, from the UE, the sounding reference signal on the first set of frequency resources based on the association. The operations of 1615 may be performed according to the methods described herein. In some examples, aspects of the operations of 1615 may be performed by an SRS receiving component as described with reference to FIGS. 9 through 12.

At 1620, the base station may determine, based on the received sounding reference signal, channel state information for at least the second set of frequency resources. The operations of 1620 may be performed according to the methods described herein. In some examples, aspects of the operations of 1620 may be performed by a CSI determining component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving a configuration identifying a first set of frequency resources for transmitting a sounding reference signal to be used at least for downlink channel state information acquisition;
    receiving an indication of an association between the configuration for the sounding reference signal and a second set of frequency resources;
    determining, based at least in part on the association, values for one or more sounding reference signal transmission parameters for the first set of frequency resources based at least in part of measuring a channel, an interference, or both, of a received physical channel, a received physical signal, or both, within the second set of frequency resources; and
    transmitting the sounding reference signal on the first set of frequency resources based at least in part on the determined one or more values.

2. The method of claim 1, wherein the second set of frequency resources comprises frequency resources that are not included in the first set of frequency resources.

3. The method of claim 1, wherein the second set of frequency resources is a superset of the first set of frequency resources.

4. The method of claim 1, wherein determining values for the one or more sounding reference signal transmission parameters further comprises:
    determining one or more uplink precoders for transmitting the sounding reference signal based at least in part on the association between the first set of frequency resources and the second set of frequency resources; and
    applying the one or more uplink precoders when transmitting the sounding reference signal on the first set of frequency resources.

5. The method of claim 1, wherein the one or more sounding reference signal transmission parameters comprise one or more uplink precoders, an uplink transmit power, one or more spatial transmit directions, or any combination thereof.

6. The method of claim 1, further comprising:
    receiving a configuration identifying resources to use to receive a channel state information reference signal, wherein the indication of the association is based at least in part on the configuration for the channel state information reference signal.

7. The method of claim 6, further comprising:
    receiving the channel state information reference signal, wherein the values for the one or more sounding reference signal transmission parameters are determined based at least in part on the received channel state information reference signal.

8. The method of claim 1, further comprising:
    receiving, jointly with the configuration identifying the first set of frequency resources, a configuration for one or more channel state information reference signals associated with the second set of frequency resources, wherein the association between the first set of frequency resources and the second set of frequency resources is determined based at least in part on the jointly received configurations.

9. The method of claim 8, further comprising:
    receiving a media access control control element activating semi-persistent occasions for the first set of frequency resources and the second set of frequency resources.

10. The method of claim 1, wherein the first set of frequency resources and the second set of frequency resources comprise different bandwidths, bandwidth parts, component carriers, radio frequency spectrum bands, or any combination thereof.

11. The method of claim 1, further comprising:
    identifying that the first set of frequency resources and the second set of frequency resources are in a same bandwidth part, different bandwidth parts, different component carriers of a same radio frequency spectrum band, or different component carriers of different radio frequency spectrum bands.

12. The method of claim 1, further comprising:
transmitting an indication of a UE capability associated with a frequency domain gap between the first set of frequency resources and the second set of frequency resources.

13. The method of claim 1, wherein the first set of frequency resources correspond to a first subset of resources within a first downlink component carrier and a second subset of resources within a second downlink component carrier, and wherein a plurality of transmission occasions of the sounding reference signal are transmitted on the first downlink component carrier and the second downlink component carrier based at least in part on a sounding reference signal carrier switching indication triggered through a third uplink component carrier.

14. The method of claim 13, wherein the second set of frequency resources comprise a bandwidth that is a higher frequency than the subset of resources of the first downlink component carrier, and the bandwidth is lower in frequency than the subset of resources of the second downlink component carrier.

15. The method of claim 1, further comprising:
identifying that the sounding reference signal has a higher priority than other sounding reference signals based at least in part on the configuration of the second set of frequency resources and the sounding reference signal being used for downlink channel state information acquisition.

16. The method of claim 15, further comprising:
determining that the second set of frequency resources comprises frequency resources within one or more different bandwidth parts, or within one or multiple component carriers, or frequency resources that are not part of the first set of frequency resources, wherein the sounding reference signal is identified as having the higher priority than the other sounding reference signals based at least in part on the second set of frequency resources comprising the frequency resources within the one or more different bandwidth parts, or within the one or multiple component carrier, or the frequency resources that are not part of the first set of frequency resources.

17. The method of claim 15, wherein the higher priority is associated with a higher priority with respect to a transmission power reduction due to carrier aggregation power scaling prioritization.

18. The method of claim 1, wherein the indication of the association between the first set of frequency resources and the second set of frequency resources is received with the configuration identifying the first set of frequency resources for transmitting the sounding reference signal.

19. A method for wireless communications at a network entity, comprising:
transmitting, to a user equipment (UE), a configuration identifying a first set of frequency resources for the UE to use to transmit a sounding reference signal, wherein the configuration indicates that the sounding reference signal is to be used at least for downlink channel state information acquisition;
transmitting an indication of an association between the first set of frequency resources and a second set of frequency resources;
receiving, from the UE, the sounding reference signal on the first set of frequency resources based at least in part on the association; and
determining, based at least in part on the received sounding reference signal, channel state information for at least the second set of frequency resources.

20. The method of claim 19, further comprising:
transmitting a configuration indicating resources for a channel state information reference signal, wherein the indication of the association is based at least in part on the configuration for the channel state information reference signal.

21. The method of claim 19, further comprising:
transmitting, jointly with the configuration identifying the first set of frequency resources, a configuration for one or more channel state information reference signals associated with the second set of frequency resources, wherein the association between the first set of frequency resources and the second set of frequency resources is implicitly indicated based at least in part on the jointly transmitted configurations.

22. The method of claim 21, further comprising:
transmitting a media access control control element to activate semi-persistent occasions for the first set of frequency resources and the second set of frequency resources.

23. The method of claim 19, wherein the first set of frequency resources and the second set of frequency resources comprise different bandwidths, bandwidth parts, component carriers, radio frequency spectrum bands, or any combination thereof.

24. The method of claim 19, wherein the association indicates that the first set of frequency resources and the second set of frequency resources are in a same bandwidth part, different bandwidth parts, different component carriers of a same radio frequency spectrum band, or different component carriers of different radio frequency spectrum band.

25. The method of claim 19, further comprising:
receiving an indication of a UE capability associated with a gap between the first set of frequency resources and the second set of frequency resources, wherein the configuration identifying the first set of frequency resources is based at least in part on the UE capability.

26. The method of claim 19, wherein the first set of frequency resources comprises a first uplink component carrier and second downlink component carrier, and wherein the sounding reference signal is received on the first uplink component carrier and the second downlink component carrier based at least in part on a sounding reference signal carrier switching.

27. The method of claim 19, wherein the indication of the association between the first set of frequency resources and the second set of frequency resources is received with the configuration identifying the first set of frequency resources for transmitting the sounding reference signal.

28. A user equipment (UE) for wireless communications, comprising:
one or more memories storing processor-executable code; and
one or more processors coupled with the one or more memories and individually or collectively operable to execute the code to cause the UE to:
receive a configuration identifying a first set of frequency resources for transmitting a sounding reference signal to be used at least for downlink channel state information acquisition;
receive an indication of an association between the configuration for the sounding reference signal and a second set of frequency resources;

determine, based at least in part on the association, values for one or more sounding reference signal transmission parameters for the first set of frequency resources based at least in part of measuring a channel, an interference, or both, of a received physical channel, a received physical signal, or both, within the second set of frequency resources; and transmit the sounding reference signal on the first set of frequency resources based at least in part on the determined one or more values.

29. A network entity for wireless communications:

one or more memories storing processor-executable code; and one or more processors coupled with the one or more memories and individually or collectively operable to execute the code to cause the network entity to:

transmit, to a user equipment (UE), a configuration identifying a first set of frequency resources for the UE to use to transmit a sounding reference signal, wherein the configuration indicates that the sounding reference signal is to be used at least for downlink channel state information acquisition;

transmit an indication of an association between the first set of frequency resources and a second set of frequency resources;

receive, from the UE, the sounding reference signal on the first set of frequency resources based at least in part on the association; and determine, based at least in part on the received sounding reference signal, channel state information for at least the second set of frequency resources.

* * * * *